(12) United States Patent
Partouche et al.

(10) Patent No.: US 9,416,655 B2
(45) Date of Patent: Aug. 16, 2016

(54) MODULAR CONNECTOR

(71) Applicant: Schlumberger Technology Corporation, Sugar Land, TX (US)

(72) Inventors: Ashers Partouche, Richmond, TX (US); Steven G. Villareal, Cheltenham (GB); Julian J. Pop, Houston, TX (US); Albert Hoefel, Sugar Land, TX (US); Kent D. Harms, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/595,048

(22) Filed: Jan. 12, 2015

(65) Prior Publication Data

US 2015/0122478 A1 May 7, 2015

Related U.S. Application Data

(63) Continuation of application No. 13/022,685, filed on Feb. 8, 2011, now Pat. No. 8,931,548, which is a continuation of application No. 11/869,491, filed on Oct. 9, 2007, now Pat. No. 7,913,774, which is a continuation-in-part of application No. 11/160,240, filed on Jun. 15, 2005, now Pat. No. 7,543,659.

(51) Int. Cl.
*E21B 49/08* (2006.01)
*E21B 49/10* (2006.01)
*E21B 17/02* (2006.01)
(Continued)

(52) U.S. Cl.
CPC ................. *E21B 49/08* (2013.01); *E21B 17/02* (2013.01); *E21B 17/028* (2013.01); *E21B 17/18* (2013.01); *E21B 47/122* (2013.01); *E21B 49/10* (2013.01); *F16L 15/02* (2013.01); *F16L 39/04* (2013.01)

(58) Field of Classification Search
CPC ....... E21B 17/02; E21B 17/028; E21B 17/18; E21B 47/122; E21B 49/08; E21B 49/10
See application file for complete search history.

(56) References Cited

U.S. PATENT DOCUMENTS 3,083,779 A   4/1963   Rowley
3,378,811 A   4/1968   Cullen et al.
(Continued)

FOREIGN PATENT DOCUMENTS

DE   4114061 C1   10/1992
EP   0302632 A1   2/1989
(Continued)

OTHER PUBLICATIONS

Combined Search and Examination Report issued in GB0722697.0 on Mar. 28, 2008, 4 pages.
(Continued)

*Primary Examiner* — James G Sayre
(74) *Attorney, Agent, or Firm* — Kenneth L. Kincaid

(57) ABSTRACT

A downhole modular tool includes a first module, a second module, a third module, and one or more connectors for connecting the first, second, and third modules. Each module includes a drill collar, a drilling fluid passageway, a first fluid passageway, and a second fluid passageway. The one or more connectors connect any one of the first, second, and third modules, to another of the first, second, and third modules to transfer the drilling fluid, the first fluid, and the second fluid between the connected modules.

18 Claims, 22 Drawing Sheets

(51) Int. Cl.
*E21B 47/12* (2012.01)
*E21B 17/18* (2006.01)
*F16L 15/02* (2006.01)
*F16L 39/04* (2006.01)

(56) References Cited

U.S. PATENT DOCUMENTS

| | | |
|---|---|---|
| 3,747,698 A | 7/1973 | Chapman |
| 3,831,443 A | 8/1974 | Planche |
| 4,043,575 A | 8/1977 | Roth |
| 4,126,848 A | 11/1978 | Denison |
| 4,690,212 A | 9/1987 | Termohlen |
| 4,705,118 A | 11/1987 | Ennis |
| 4,708,201 A | 11/1987 | Reed |
| 4,817,716 A | 4/1989 | Taylor et al. |
| 4,836,305 A * | 6/1989 | Curlett .......................... 175/215 |
| 4,860,581 A | 8/1989 | Zimmerman et al. |
| 4,913,466 A | 4/1990 | Becker |
| 4,936,139 A | 6/1990 | Zimmerman et al. |
| 4,971,160 A | 11/1990 | Upchurch |
| 4,998,837 A | 3/1991 | Kageyama et al. |
| 5,052,941 A | 10/1991 | Hernandez-Marti et al. |
| 5,152,944 A | 10/1992 | Khalil |
| 5,221,214 A | 6/1993 | Martin |
| 5,242,020 A | 9/1993 | Cobern |
| 5,251,695 A | 10/1993 | Coronado |
| 5,251,708 A | 10/1993 | Perry et al. |
| 5,316,094 A | 5/1994 | Pringle |
| 5,344,337 A | 9/1994 | Ritter |
| 5,407,292 A | 4/1995 | Collins |
| 5,417,291 A | 5/1995 | Leising |
| 5,439,051 A | 8/1995 | Kennedy et al. |
| 5,577,925 A | 11/1996 | Schnatzmeyer et al. |
| 5,700,161 A | 12/1997 | Plummer et al. |
| 5,803,186 A | 9/1998 | Berger et al. |
| 5,823,266 A | 10/1998 | Burleson et al. |
| 5,842,522 A | 12/1998 | Echols et al. |
| 5,931,232 A | 8/1999 | Echols et al. |
| 5,934,383 A | 8/1999 | Jurgens et al. |
| 5,957,209 A | 9/1999 | Burleson et al. |
| 5,967,816 A | 10/1999 | Sampa et al. |
| 5,992,523 A | 11/1999 | Burleson et al. |
| 5,992,893 A | 11/1999 | Watkins |
| 6,000,470 A | 12/1999 | Skinner et al. |
| 6,003,621 A | 12/1999 | Murray |
| 6,026,915 A | 2/2000 | Smith et al. |
| 6,047,239 A | 4/2000 | Berger et al. |
| 6,059,042 A | 5/2000 | Huber et al. |
| 6,062,905 A | 5/2000 | Sampa et al. |
| 6,098,716 A | 8/2000 | Hromas et al. |
| 6,155,608 A | 12/2000 | Skinner et al. |
| 6,157,893 A | 12/2000 | Berger et al. |
| 6,168,213 B1 | 1/2001 | Muller |
| 6,179,066 B1 | 1/2001 | Nasr et al. |
| 6,186,229 B1 | 2/2001 | Martin et al. |
| 6,230,557 B1 | 5/2001 | Ciglenec et al. |
| 6,264,244 B1 | 7/2001 | Isennock et al. |
| 6,296,066 B1 | 10/2001 | Terry et al. |
| 6,301,959 B1 | 10/2001 | Hrametz et al. |
| 6,325,162 B1 | 12/2001 | Eppink et al. |
| 6,367,557 B1 | 4/2002 | Rosine et al. |
| 6,390,193 B1 | 5/2002 | Martin et al. |
| 6,396,414 B1 | 5/2002 | Bickford |
| 6,439,232 B1 | 8/2002 | Brain |
| 6,443,780 B2 | 9/2002 | Wilbourn et al. |
| 6,505,682 B2 | 1/2003 | Brockman |
| 6,510,899 B1 | 1/2003 | Sheiretov et al. |
| 6,511,335 B1 | 1/2003 | Rayssiguier et al. |
| 6,565,129 B2 | 5/2003 | Surjaatmadja |
| 6,582,145 B1 | 6/2003 | Malone et al. |
| 6,585,045 B2 | 7/2003 | Lee et al. |
| 6,609,568 B2 | 8/2003 | Krueger et al. |
| 6,641,434 B2 | 11/2003 | Boyle et al. |
| 6,670,880 B1 | 12/2003 | Hall et al. |
| 6,681,861 B2 | 1/2004 | Davidson et al. |
| 6,688,396 B2 | 2/2004 | Floerke et al. |
| 6,717,501 B2 | 4/2004 | Hall et al. |
| 6,719,049 B2 | 4/2004 | Sherwood et al. |
| 6,755,253 B2 | 6/2004 | Smith et al. |
| 6,761,574 B1 | 7/2004 | Song et al. |
| 6,766,853 B2 | 7/2004 | Restarick et al. |
| 6,776,636 B1 | 8/2004 | Cameron et al. |
| 6,837,314 B2 | 1/2005 | Krueger et al. |
| 6,964,301 B2 | 11/2005 | Hill et al. |
| 7,191,831 B2 | 3/2007 | Reid et al. |
| 7,367,394 B2 | 5/2008 | Villareal et al. |
| 7,404,725 B2 | 7/2008 | Hall et al. |
| 7,493,959 B2 | 2/2009 | Johnson et al. |
| 7,543,659 B2 | 6/2009 | Partouche et al. |
| 7,594,541 B2 | 9/2009 | Ciglenec et al. |
| 7,886,832 B2 | 2/2011 | Partouche |
| 7,913,774 B2 | 3/2011 | Partouche |
| 8,931,548 B2 | 1/2015 | Partouche et al. |
| 2002/0066561 A1 | 6/2002 | Brockman |
| 2002/0112852 A1 | 8/2002 | Floerke et al. |
| 2003/0230893 A1 | 12/2003 | Song et al. |
| 2004/0000433 A1 | 1/2004 | Hill et al. |
| 2004/0132919 A1 | 7/2004 | Kobayashi et al. |
| 2005/0011644 A1 | 1/2005 | Krueger et al. |
| 2005/0098356 A1 | 5/2005 | Chau |
| 2005/0284629 A1 | 12/2005 | Reid et al. |
| 2006/0000603 A1 | 1/2006 | Zazovsky et al. |
| 2006/0073722 A1 | 4/2006 | Allan |
| 2006/0101905 A1 | 5/2006 | Bittleston et al. |
| 2008/0078556 A1 | 4/2008 | Stoesz et al. |

FOREIGN PATENT DOCUMENTS

| | | |
|---|---|---|
| EP | 0953726 A1 | 11/1999 |
| EP | 1505248 A2 | 2/2005 |
| GB | 242724 A | 11/1925 |
| GB | 1157155 A | 7/1969 |
| GB | 2415718 A | 1/2006 |
| GB | 2427214 A | 12/2006 |
| JP | S54134001 A | 10/1979 |
| JP | H01-111988 A | 4/1989 |
| JP | H05-118186 A | 5/1993 |
| JP | H09-158663 A | 6/1997 |
| JP | H10-252369 A | 9/1998 |
| JP | 2001082061 A | 3/2001 |
| JP | 2002524678 A | 8/2002 |
| JP | 2005037313 A | 2/2005 |
| JP | 2005532491 A | 10/2005 |
| JP | 2007518905 A | 7/2007 |
| RU | 2194839 C2 | 12/2002 |
| WO | 0043812 A1 | 7/2000 |
| WO | 0206716 A1 | 1/2002 |
| WO | 2005059298 A1 | 6/2005 |
| WO | 2007146801 A2 | 12/2007 |

OTHER PUBLICATIONS

Examination Report issued in GB0722697.0 on Nov. 19, 2008, 1 page.
Examination Report issued in GB0722697.0 on May 21, 2009, 2 pages.
Second Office Action issued in CN200810086157.5 on Jan. 30, 2012, 5 pages.
Examination Report issued in CA2702020 on Apr. 12, 2012, 3 pages.
Office Action issued in RU2010118469 on May 2, 2012, 7 pages.
Examination Report issued in CA2689858 on Aug. 1, 2012, 2 pages.
Examination Report issued in GCC/P/2008/11889 on Sep. 4, 2012, 3 pages.
Office Action issued in CN200880119981.4 on Aug. 27, 2012, 8 pages.
Office Action issued in MX/A/2010/003742 on Sep. 26, 2012, 2 pages.
Decision on Grant issued in RU2010118469 on Oct. 5, 2012, 10 pages.
Office Action issued in JP2010528943 on Jan. 16, 2013, 9 pages.
Examination Report issued in EP08837105.9 on Feb. 26, 2013, 5 pages.

(56) References Cited

OTHER PUBLICATIONS

Search Report issued in EP13155115.2 on Apr. 22, 2013, 5 pages.
Office Action issued in CN200880119981.4 on May 14, 2013, 6 pages.
Examination Report issued in DE102006027545.4 on Feb. 12, 2015, 11 pages.
Non-Final Office Action issued in Related U.S. Appl. No. 12/434,030 on Jun. 30, 2010; 13 pages.
Notice of Allowance issued in Related U.S. Appl. No. 12/434,030 on Dec. 03 2010; 4 pages.
International Search Report & Written Opinion issued in PCT/US2008/078312 on Jan. 4, 2009; 7 pages.

* cited by examiner

MODULAR CONNECTOR

CROSS REFERENCE TO RELATED APPLICATIONS

This application is a continuation of U.S. patent application Ser. No. 13/022,685, filed Feb. 8, 2011, now U.S. Pat. No. 8,931,548, which is a continuation of U.S. patent application Ser. No. 11/869,491, filed Oct. 9, 2007, now U.S. Pat. No. 7,913,774, which is a continuation-in-part application of U.S. patent application Ser. No. 11/160,240, filed on Jun. 15, 2005, now U.S. Pat. No. 7,543,659, the contents of all of which are incorporated herein by reference for all purposes.

BACKGROUND

1. Field of the Invention

The present invention relates to the downhole tools for use in subterranean formation evaluation and, more specifically, to the modularity of components in a downhole tool for use in a while-drilling environment.

2. Background of the Related Art

Wellbores (also known as boreholes) are drilled for hydrocarbon prospecting and production. It is often desirable to perform various evaluations of the formations penetrated by a wellbore during drilling operations, such as during periods when actual drilling has temporarily stopped. In some cases, the drill string may be provided with one or more drilling tools to test and/or sample the surrounding formation. In other cases, the drill string may be removed from the wellbore, in a sequence called a "trip," and a wireline tool may be deployed into the wellbore to test and/or sample the formation. The samples or tests performed by such downhole tools may be used, for example, to locate valuable hydrocarbon-producing formations and manage the production of hydrocarbons therefrom.

Such drilling tools and wireline tools, as well as other wellbore tools conveyed on coiled tubing, drill pipe, casing or other conveyers, are also referred to herein simply as "downhole tools." Such downhole tools may themselves include a plurality of integrated modules, each for performing a separate function, and a downhole tool may be employed alone or in combination with other downhole tools in a downhole tool string.

More particularly, formation evaluation often requires that fluid from the formation be drawn into a downhole tool (or module thereof) for testing in situ and/or sampling. Various devices, such as probes and/or packers, are extended from the downhole tool to isolate a region of the wellbore wall, and thereby establish fluid communication with the formation surrounding the wellbore. Fluid may then be drawn into the downhole tool using the probe and/or packer.

The collection of such formation fluid samples while drilling is ideally performed with an integrated sampling/pressure tool that contains several modules each for performing various functions such as electrical power supply, hydraulic power supply, fluid sampling (e.g., probe or dual packer), fluid analysis, and sample collection (e.g., tanks). Such modules are depicted, for example, in U.S. Pat. Nos. 4,860,581 and 4,936,139. Accordingly, a downhole fluid, such as formation fluid, is typically drawn into the downhole tool for testing and/or sampling. This and other types of downhole fluid (other than drilling mud pumped through a drill string) are referred to hereinafter as "auxiliary fluid." This auxiliary fluid may be a sampled formation fluid, or specialty fluids (e.g., workover fluids) for injection into a subsurface formation. The auxiliary fluid typically has utility in a downhole operation, other than merely lubricating a drill bit and/or carrying away bit cuttings to the surface. This auxiliary fluid may be transferred between modules of an integrated tool such a sampling tool, and/or between tools interconnected in a tool string. Moreover, electrical power and/or electronic signals (e.g., for data transmission) may also be transferred between modules of such tools. A challenge is therefore to maintain a workable tool length (e.g. 30 feet) while performing the necessary fluid and electrical transfers between modules of the tool.

It will be further appreciated that several other applications will require the communication of fluid and electrical signals between sequentially-positioned modules or tools of downhole tool strings—in both wireline and "while drilling" operations. The "while drilling" operations are typically characterized as part of the measurement-while-drilling (MWD) and/or logging-while-drilling (LWD) operations, in which the communication of electricity (both power and signals) across connected tools or integrated tool modules is required. Various devices have been developed to conduct such while drilling operations, such as the devices disclosed in U.S. Pat. No. 5,242,020, issued to Cobern; U.S. Pat. No. 5,803,186, issued to Berger et al.; U.S. Pat. No. 6,026,915, issued to Smith et al.; U.S. Pat. No. 6,047,239, issued to Berger et al.; U.S. Pat. No. 6,157,893, issued to Berger et al.; U.S. Pat. No. 6,179,066, issued to Nasr et al.; and U.S. Pat. No. 6,230,557, issued to Ciglenec et al. These patents disclose various downhole tools and methods for collecting data, and in some cases fluid samples, from a subsurface formation.

Despite advances in sampling and testing capabilities in downhole tools, existing systems—particularly "while drilling" systems—are often limited to solutions for transferring electrical signals across tools or tool modules. Particular solutions include the various ring-type connectors at the joints of connected tubular members, such as "wired drill pipe" (WDP), as described in U.S. Pat. No. 6,641,434 assigned to Schlumberger, among others. Such WDP connectors are not known to provide for the transfer of electrical signals between the connected tubular members.

Connectors have also been provided for passing fluid through downhole wireline tools. Examples of such connectors are shown in U.S. Pat. No. 5,577,925, assigned to Halliburton and U.S. patent application Ser. No. 10/721,026. However, no known connectors are disclosed for connecting auxiliary flowlines that extend through and terminate at or near opposing ends of connected wellbore tubulars, or for facilitating a connection between connected components. Moreover, known connectors or connector systems have not been faced with the additional challenges of drilling tools which involve drill collar, drilling mud, space limitation and harsh drilling issues.

A need therefore exists for a connector that is adapted for communicating auxiliary fluid and/or electrical signals between tool modules and/or tools in a downhole tool string. It is desirable that such a connector exhibit the function of length adjustment so as to compensate for variations in the separation distance between the modules/tools to be connected. It is further desirable that such a connector exhibits the function of automatically sealing off auxiliary fluid flow therethrough upon disconnection of the connected modules/tools. It is further desirable that components connectable with the connector be modular, and be adaptable for use in varying environments and conditions.

Definitions

Certain terms are defined throughout this description as they are first used, while certain other terms used in this description are defined below:

"Auxiliary fluid" means a downhole fluid (other than drilling mud pumped through a drill string), such as formation fluid that is typically drawn into the downhole tool for testing and/or sampling, or specialty fluids (e.g., workover fluids) for injection into a subsurface formation. Auxiliary fluids may also include hydraulic fluids, useful for example for actuating a tool component such as a hydraulic motor, a piston, or a displacement unit. Auxiliary fluids may further comprise fluids utilized for thermal management within the bottom hole assembly, such as a cooling fluid. The auxiliary fluid typically has utility in a downhole operation, other than merely lubricating a drill bit and/or carrying away bit cuttings to the surface.

"Component(s)" means one or more downhole tools or one or more downhole tool module(s), particularly when such tools or modules are employed within a downhole tool string.

"Electrical" and "electrically" refer to connection(s) and/or line(s) for transmitting electronic signals.

"Electronic signals" mean signals that are capable of transmitting electrical power and/or data (e.g., binary data).

"Module" means a section of a downhole tool, particularly a multi-functional or integrated downhole tool having two or more interconnected modules, for performing a separate or discrete function.

"Modular" means adapted for (inter)connecting modules and/or tools, and possibly constructed with standardized units or dimensions for flexibility and variety in use.

SUMMARY

According to one aspect of the disclosure, a modular tool for use in subterranean formations that includes a first module, a second module, and one or more connectors for connecting the first and second modules is disclosed. The first module includes a first collar that at least partially defines an exterior of the tool and includes a first engagement mechanism at a first end of the collar, a second engagement mechanism at a second end of the collar, and a fluid passageway for passing drilling fluid therethrough. The second module includes a second collar that at least partially defines an exterior of the tool and that includes a first engagement mechanism at a first end of the collar for engaging the second end of the first collar, a second engagement mechanism at a second end of the collar, and a fluid passageway extending a length of the module for passing drilling fluid therethrough. The one or more connectors provide for a auxiliary line connection and a wire connection for transmitting power and/or data between the modules.

According to another aspect of the disclosure, a system for drilling a well bore is disclosed. The system includes a drill string for providing a flow of drilling fluid from the surface, a formation testing tool having a first end operatively connected to the drill string and a drill bit operatively connected to a second end of the tool wherein the drill bit receives drilling fluid from the drill string through the formation testing tool. The formation testing tool includes a plurality of modules that each includes at least one flowline and a drilling fluid passageway. A first of the plurality of modules is operatively connectable to a first end or a second end of a second of the plurality of modules, thereby allowing transmission of the fluid in the flowline and the drilling fluid passageway between the first and second modules.

According to another aspect of the disclosure, a method of assembling a downhole tool at a job site is disclosed. The method includes providing a first module and a second module each having a collar that at least partially defines an exterior of the tool, and connecting a flowline of the first module to a flowline of the second module, the flowlines being fluidly connected to an exterior of the tool. The collar of the first module includes a first threaded portion at a first end of the collar and a second threaded portion at a second end of the collar, and a fluid passageway extending a length of the module for passing drilling fluid therethrough. The collar of the second module includes a first threaded portion at a first end of the collar and a second threaded portion at a second end of the collar, and a fluid passageway extending a length of the module for passing drilling fluid therethrough.

According to yet another aspect of the disclosure, a method of reconfiguring a plurality of modules for a while-drilling tool to obtain a plurality of tools is disclosed. The method includes providing a plurality of modules, wherein each module includes at least one flowline and a drilling fluid passageway; connecting the plurality of modules in a first configuration to obtain a first downhole tool; and connecting the plurality of modules in a second configuration to obtain a second downhole tool.

BRIEF DESCRIPTION OF THE DRAWINGS

So that the above recited features and advantages of the present invention can be understood in detail, a more particular description of the invention, briefly summarized above, is presented by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present disclosure provides a connector and modular system that allows fluid as well as electrical signals to be transferred between nearby tools or modules while maintaining standard drilling operations. Thus, e.g., by utilizing the present disclosure, two LWD or wireline tools or modules can be connected for fluid (hydraulic) and electrical communication therebetween. The connector is adaptable for placement anywhere on a downhole tool string where such communication is needed.

Figure 1:
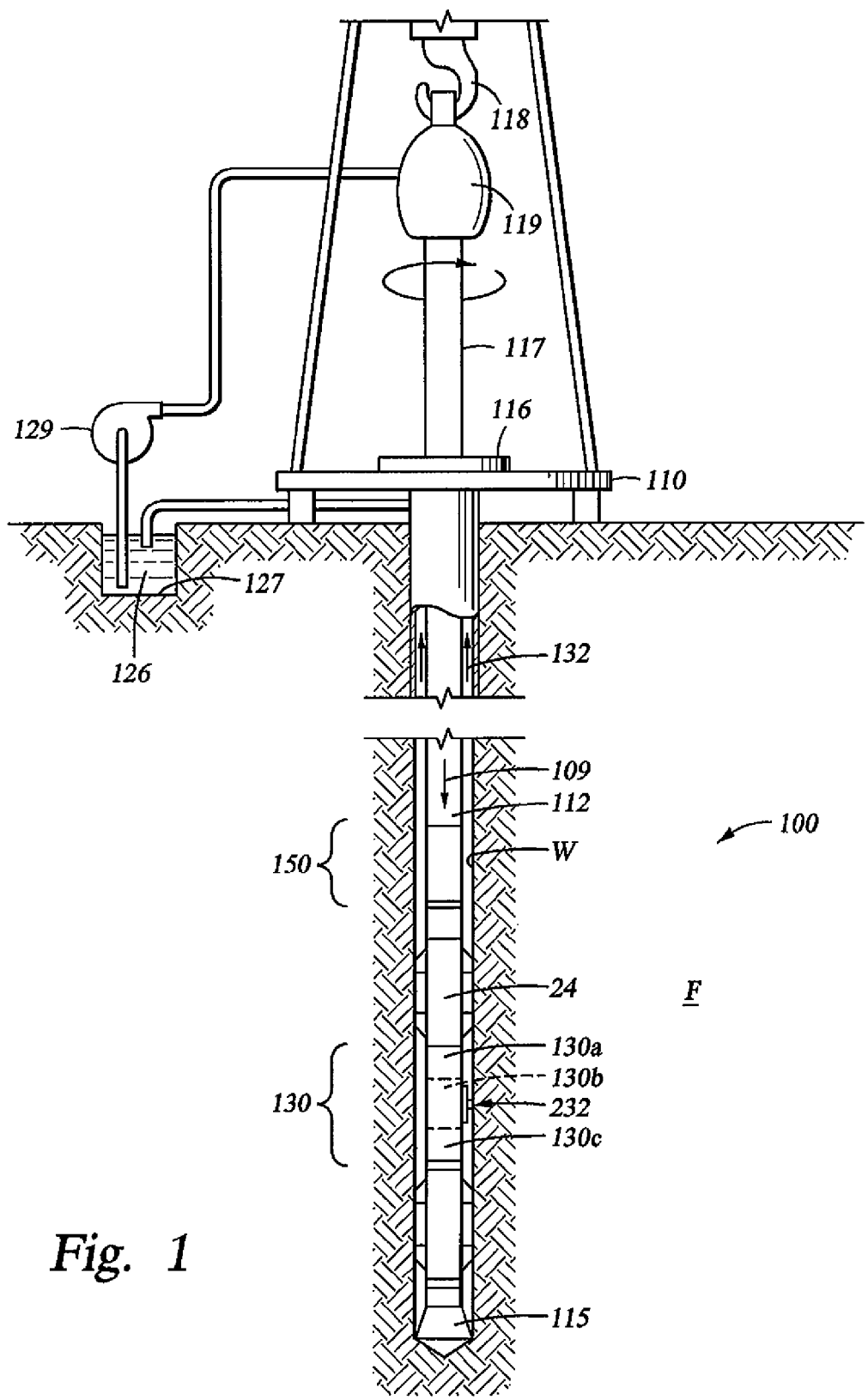
FIG. 1 is a schematic view, partially in cross-section of a conventional drill string extended from a rig into a wellbore, the drill string having a formation tester assembly including a plurality of modules connected by connector(s) therebetween.

FIG. 1 illustrates a conventional drilling rig and drill string in which the present disclosure can be utilized to advantage. A land-based platform and derrick assembly 110 are positioned over a wellbore W penetrating a subsurface formation F. In the illustrated embodiment, the wellbore W is formed by rotary drilling in a manner that is well known. Those of ordinary skill in the art given the benefit of this disclosure will appreciate, however, that the present disclosure also finds application in directional drilling applications as well as rotary drilling, LWD, and MWD applications and is not limited to land-based rigs.

A drill string 112 is suspended within the wellbore W and includes a drill bit 115 at its lower end. The drill string 112 is rotated by a rotary table 116, energized by means not shown, which engages a kelly 117 at the upper end of the drill string. The drill string 112 is suspended from a hook 118, attached to a traveling block (also not shown), through the kelly 117 and the rotary swivel 119 which permits rotation of the drill string relative to the hook.

Drilling fluid or mud 126 is stored in a pit 127 formed at the well site. A pump 129 delivers drilling fluid (also known as mud) 126 to the interior of the drill string 112 via a port in the swivel 119, inducing the drilling fluid to flow downwardly through the drill string 112 as indicated by directional arrow 109. The drilling fluid 126 exits the drill string 112 via ports in the drill bit 115, and then circulates upwardly through the annulus between the outside of the drill string and the wall of the wellbore, as indicated by direction arrows 132. In this manner, the drilling fluid lubricates the drill bit 115 and carries formation cuttings up to the surface as it is returned to the pit 127 for recirculation.

The drill string 112 further includes a bottom hole assembly, generally referred to as 100, near the drill bit 115 (in other words, within several drill collar lengths from the drill bit). The bottom hole assembly, or BHA, 100 includes capabilities for measuring, processing, and storing information, as well as communicating with the surface. The BHA 100 further includes drill collar-conveyed tools, stabilizers, etc. for performing various other measurement functions, and surface/local communications subassembly 150 for performing telemetry functions.

Drill string 112 is further equipped in the embodiment of FIG. 1 with a drill collar 130 that houses a formation testing tool having various connected modules 130a, 130b, and 130c, for example, for performing various respective functions such as providing electrical or hydraulic power, flow control, fluid sampling, fluid analysis, and fluid sample storage. Additional modules and configurations for the BHA will be discussed in more detail with respect to FIGS. 2A-3C. Module 130b is a probe module having a probe 232 for engaging the wall of the wellbore W and extracting representative samples of fluid from the formation F, as is generally known to those having ordinary skill in the art. Another of the modules (e.g., module 130c) is equipped with PVT-quality chambers (also known as tanks or cylinders) for storage of representative or "clean" fluid samples communicated through the probe module 130b.

Figure 2A:
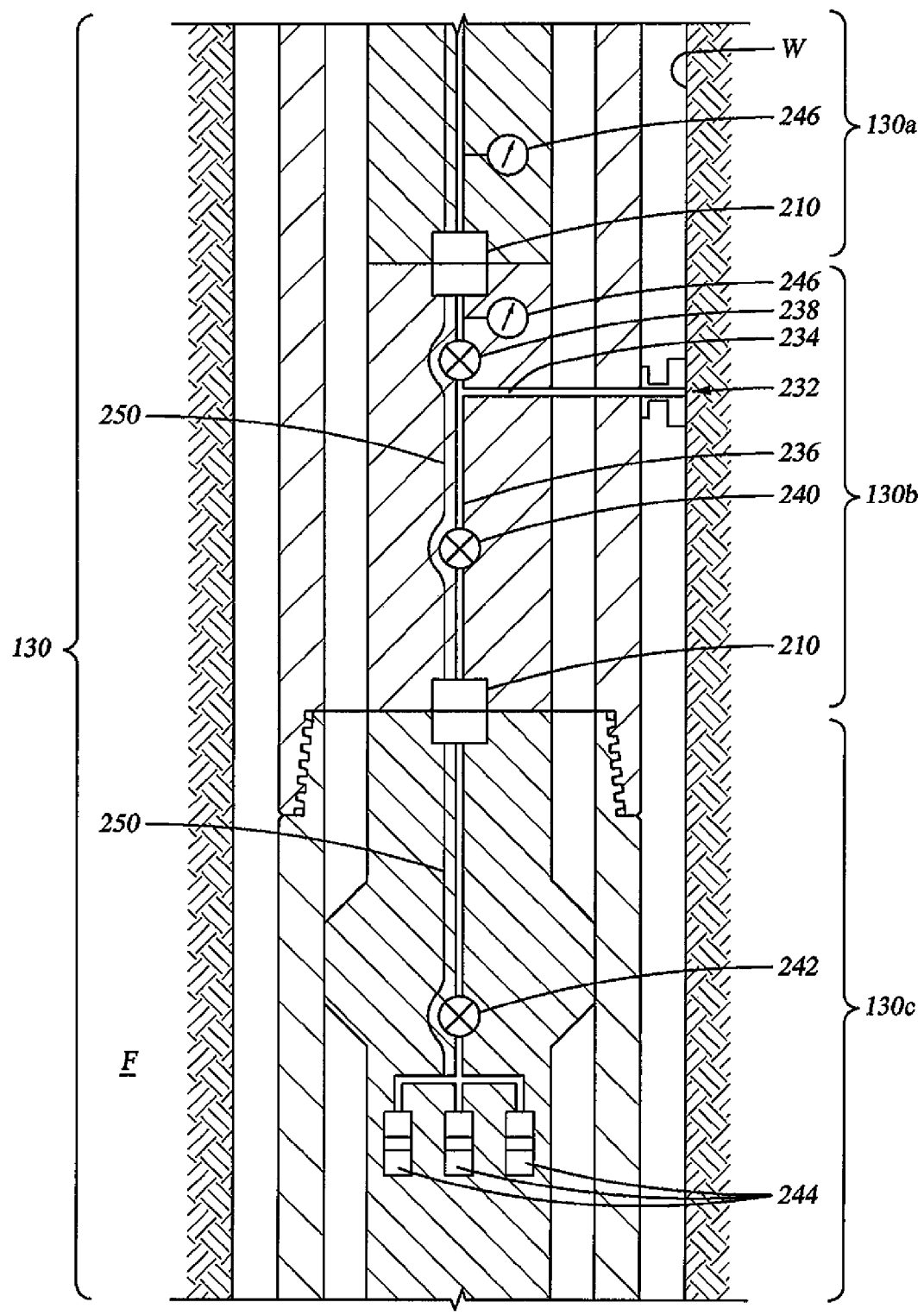
FIG. 2A is a schematic sectional representation of a portion of the drill string of FIG. 1 depicting the formation tester assembly and some of its interconnected modules in greater detail.

FIG. 2A shows the formation tester assembly 130 of FIG. 1 in greater detail, particularly the probe module 130b and sample storage module 130c. The probe module 130b is equipped with a probe assembly 232 for engaging the wall of the wellbore W and drawing fluid from the formation F into the central flow line 236 via the probe line 234. Valves 238, 240, and 242 (among others) are manipulated to fluidly-connect the probe 232 to a flow control module (not shown) for drawing the formation fluid into the flow line 236 and pumping the sampled fluid to appropriate modules within the formation tester 130 for analysis, discharge to the wellbore annulus, or storage, etc. Sample storage module 130c is equipped with one or more sample storage chambers 244 for receiving and storing PVT-quality fluid samples for subsequent analysis at the surface.

Connectors 210 are employed for conducting the sampled fluid between the adjacent modules (which in reality may not be abutting, as suggested in FIG. 2, and explained further below) and for conducting electrical signals through an electrical line 250 that also runs through the modules for communicating power, and possibly data, between the various modules (130a, b, c) of the formation tester 130. However, as described below, depending on the modules used in the BHA, the connectors 210 (and all of the other connectors described herein) may communicate one or more hydraulic lines and/or one or more fluid lines. In addition, one or more pressure gauges 246 may be used in cooperation with one or more sampling probes (only one probe 232 is shown) to facilitate fluid sampling and pressure measurement, as well as pressure gradient determination and other reservoir testing operations. Additionally, the integrity of the connectors 210 may be verified by appropriate use of sensors such as the pressure gauges 246. Accordingly, the inventive connectors are adaptable to numerous configurations and applications, and is furthermore not limited to formation testing tools, as will be apparent to those skilled in the art having the benefit of this disclosure.

Figure 2B:
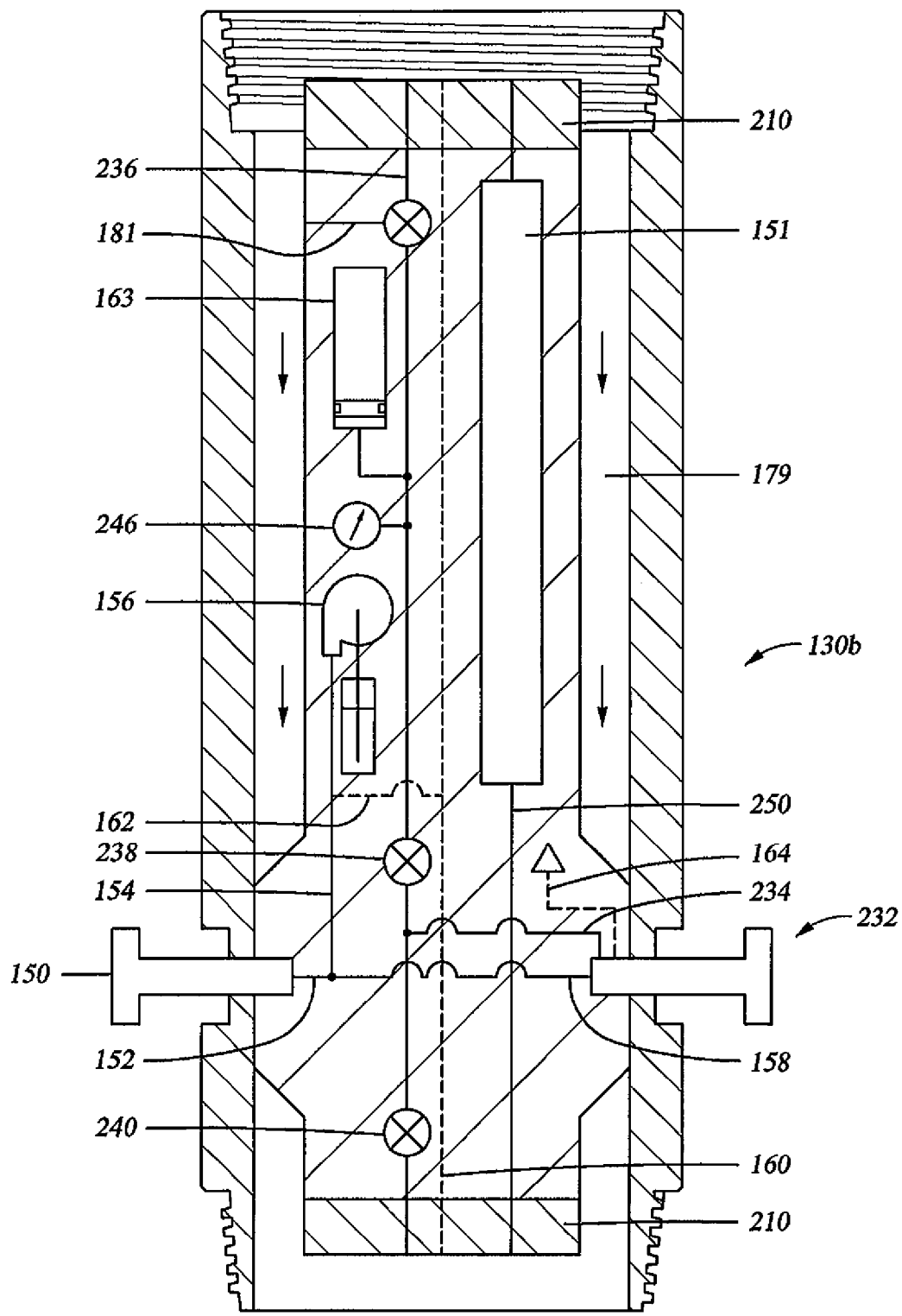
FIG. 2B is a more detailed schematic view, partially in cross-section, of the exemplary probe module shown in FIG. 2A.

FIG. 2B shows the probe module of FIG. 2A in greater detail. For example, in addition to the various parts or assemblies described above, the probe module 130b may include an electronics assembly 151 and a setting or back-up piston 150 for securing the BHA 100 in the well bore W. The electronics assembly 151 is communicably coupled to the electrical line 250 for communicating data and/or power therebetween. In addition, the electronics assembly 151 may be communicably coupled to one or more sensors (such as the pressure gauge 246) disposed in and around the module 130b for collecting and communicating corresponding information. However, other pressure sensors and/or other sensors (not shown) may be disposed in the probe 232, the flowline 236, in the setting piston 150 etc. The electronics assembly may further be operatively coupled to valves, such as valves 238 and 240 of the illustrative example shown in FIG. 2B.

The setting piston 150 may operate in conjunction with the probe 232 in securing the BHA 100. The setting piston 150 may be fluidly connected by a hydraulic line 152 to a hydraulic line 154. The hydraulic line 154 may be connected to a pump 156 which provides sufficient power to extend the setting piston 150 and the probe 232. More specifically, the pump 156 may also be fluidly coupled to a hydraulic line 158 via the hydraulic line 154 to enable extension of the probe 232 against the wellbore wall. Alternatively, the setting piston 150 may be extended or actuated using something other than hydraulic means, such as electromechanical means, for example.

Figures 3A, 3B, 3C:
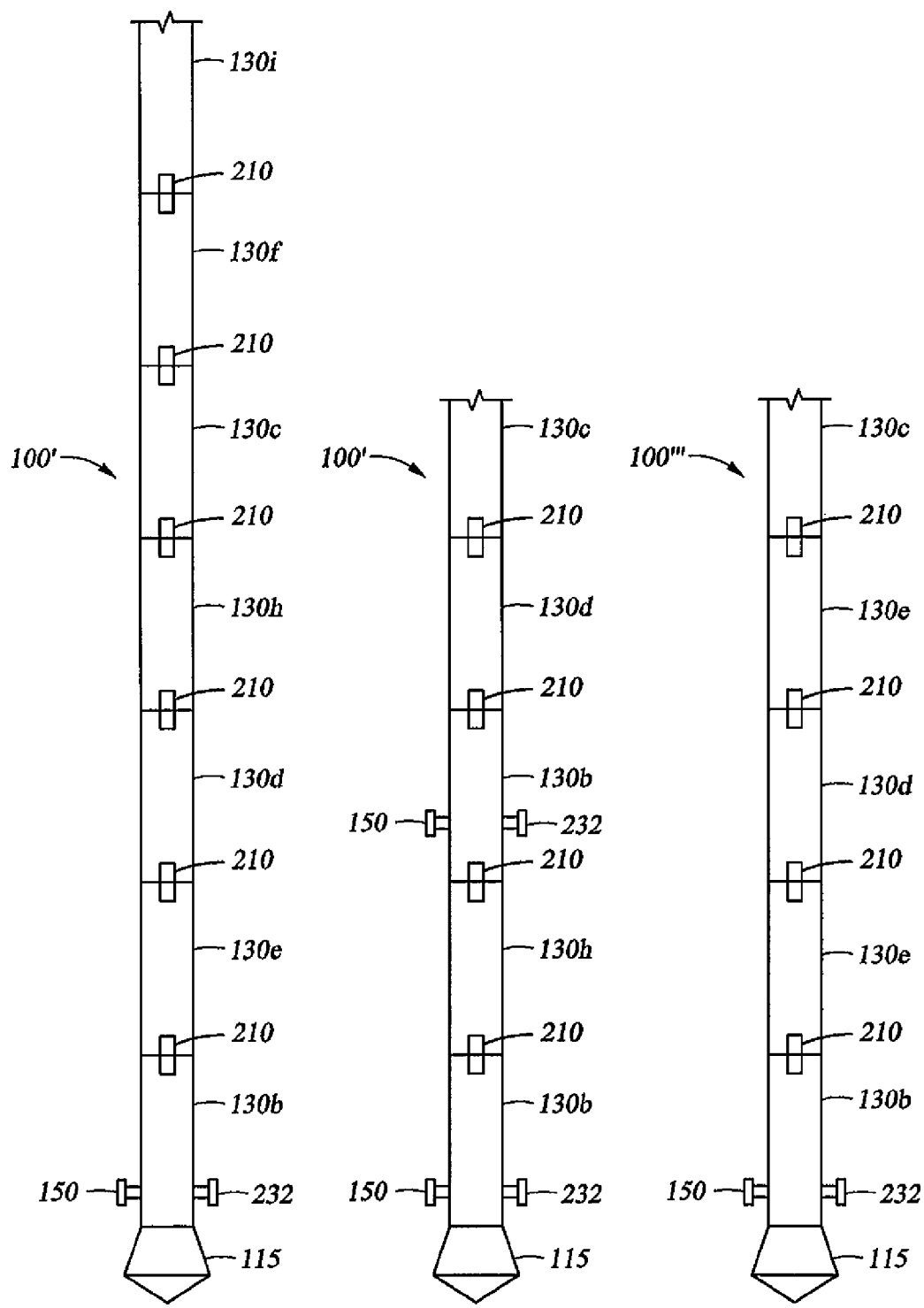
FIG. 3A is a schematic view of a drill string having a first configuration utilizing two or more modules as shown in FIGS. 2A-2D.
FIG. 3B is a schematic view of a drill string having a second configuration utilizing two or more modules as shown in FIGS. 2A-2D.
FIG. 3C is a schematic view of a drill string having a third configuration utilizing two or more modules as shown in FIGS. 2A-2D.

In an alternate embodiment, the power necessary to operate the probe 232 and/or the setting piston 150 may be provided by a pump or displacement unit located elsewhere in the BHA. For example, the power may be provided by a hydraulic module 130h, as illustrated in FIGS. 3A and 3B. The hydraulic module 130h may include a pump (not shown) to provide the necessary hydraulic power. Thus, one or more hydraulic lines 160 may extend through the module 130b for powering assemblies within the module 130b, or to power other assemblies in other modules of the formation tester assembly 130. For example, a hydraulic line 162 may fluidly connect the line 160 to the probe 232 and the setting piston 150 through the line 154. It is worth noting that for brevity and clarity of the application, the hydraulic lines, whether two or more, are represented throughout this disclosure and drawings by a single line. For example, the lines 156 and 158 extending between the pump 156 and the probe 232 may in actuality be two hydraulic lines, wherein one of the lines provides power or pressure and the other is a return line, for example.

In addition to the parts or assemblies described in relation to FIG. 2A, the probe module 130b may also include a pretest piston 163 fluidly connected to the probe 232 and, in this embodiment, is fluidly connected via the flowlines 236 and 234. The piston 163 may be actuated with a roller screw and a motor, or with other known means. The power to operate the probe module 130b may generated by a power source internal to the module 130b, but may be provided by another module 130, such as through one or more of the connectors 210, for example. As those of ordinary skill in the art understand, the pretest piston 163 may be used to obtain formation parameters, such as a formation pressure for example. Furthermore, the probe module 130b may include a second flow line 164 fluidly coupled to the probe 232. The second flowline 164, although not shown in the FIGS., may be fluidly coupled, selectively or otherwise, to the same parts or assemblies as the flowline 236. Alternatively, the second flowline 164 may be fluidly coupled to its own parts or assemblies to accomplish the same or similar functions as those that are fluidly coupled to the flowline 236. As such, the probe module 130b, the connectors and the tool as a whole will include the infrastructure to support at least two sample flowlines and thus dual inlet or guarded sampling. For example, the dual inlets may be positioned and adapted to provide sampling of contaminated fluid through the first flowline 236 and sampling of clean or virgin formation fluid through the second flowline 164. The flowlines 164 and 236 may, however, be used in combination to provide other features or advantages. More specifically, the flowlines 164 and 236 may both be utilized for providing passage of contaminated fluid, or can be manipulated to carry drilling fluid, for example.

Figure 2C:
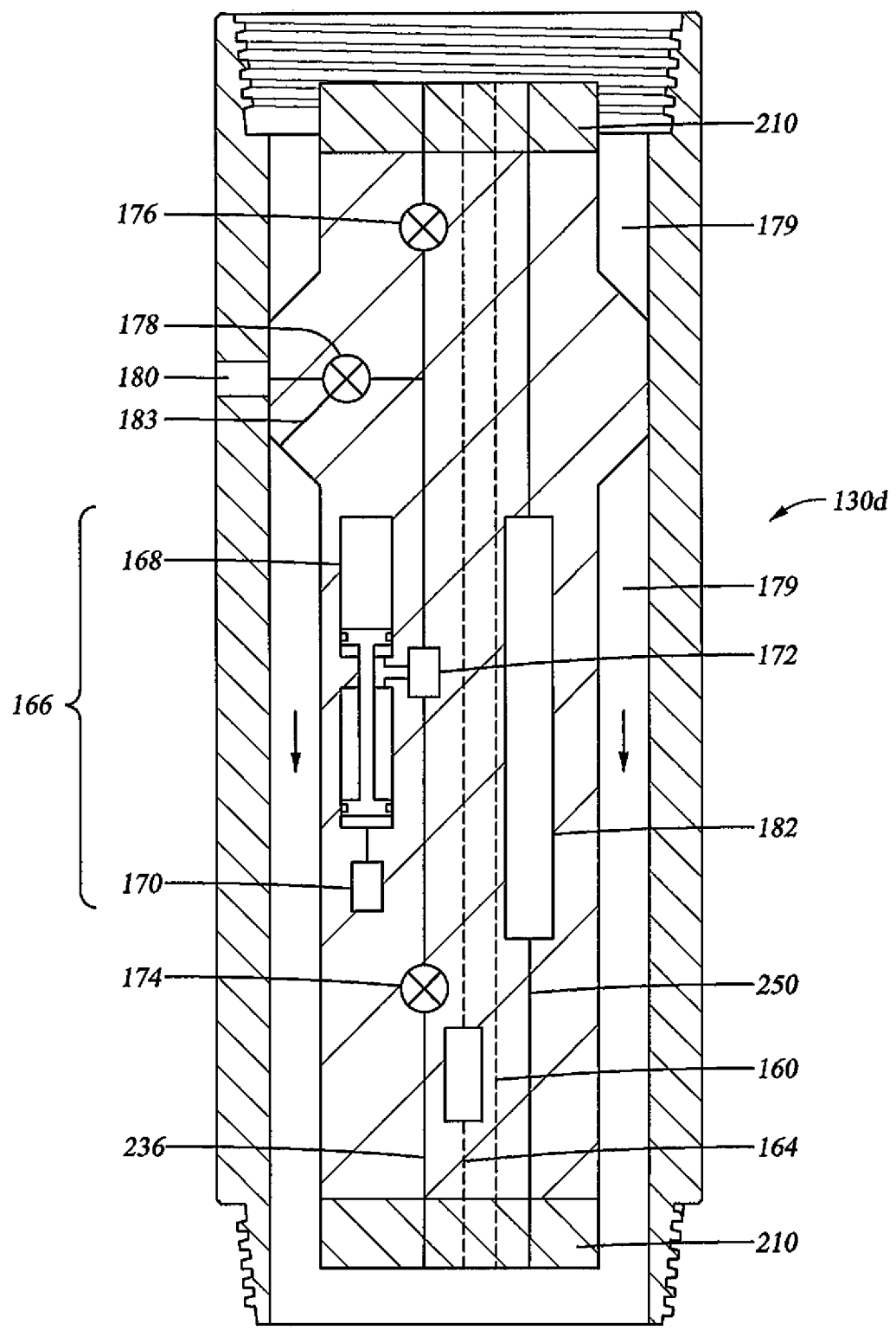
FIG. 2C is a schematic view, partially in cross-section, of an exemplary pump-out for use in a drill string.

FIG. 2C shows a pump-out module 130d that is usable with one or more of the other modules 130a-i. The pump-out module, includes a pump 166 having a displacement unit 168 and an actuator 170, such as a linear motor or hydraulic pump for example. The pump 166 is fluidly coupled to the probe 232, and provides the necessary pressure and flowrate for sampling formation fluid, and transporting the various fluids throughout the various modules of the tool. The pump 166 may further include a valve system 172 disposed between the displacement unit 168 and the flowline 236 to regulate the flow of fluid entering and the exiting displacement unit 168. Valves 174, 176, and 178 (among others) are manipulated to fluidly connect the pump 166 to the probe 232 and various other modules for controlling the flow of fluid and pumping the sampled fluid to appropriate modules within the formation tester 130 for analysis, discharge to the wellbore annulus, or storage, etc. For example, the valve 178 is disposed between the flowline 236 and an outlet 180 that provides for an exit of the fluid in the flowline 236 into the wellbore W.

As illustrated in FIGS. 2B and 2C, it is also contemplated herein that one or more of the components of the tool discussed herein is fluidly coupled or fluidly communicates with an interior of the tool, such as an inner annulus or flowbore 179. The inner annulus or flowbore 179 provides a conduit for the drilling mud of fluid 126 as it flows from the drill string 112 to the drill bit 115. For example, as illustrated in FIG. 2B, the probe module 130b may include a flowline 181 extending from the flowline 236 through one or more valves to the annulus 179. In this configuration, the flowline 181 may be used to dump, relief or exit fluid from the flowline 236 into the downwardly flowing drilling fluid 126. Similarly, as illustrated in FIG. 2C, the pump-out module 130d may include a flowline 183 extending from the valve 178 into the annulus 179. The one or more flowline(s) into the annulus, whether disposed the module 130b, 130d, or any other module 130, are not limited in their functionality and location as described above, but may connect various other components/flowlines into the inner annulus or flowbore 179. For example and not by limitation, even though not shown, the one or more sample storage chambers 244 in FIG. 2A and the pretest piston 163 in FIG. 2B, may each be luifly connected to the inner annulus or flowbore 179.

An electronics assembly 182 is communicably coupled to the electrical line 250 for communicating data and/or power therebetween. In addition, the electronics assembly 182 may be communicably coupled to one or more sensors (not shown) disposed in and around the module 130*d* for collecting and communicating data. For example, position sensors, flowrate sensors and/or pressure sensors may be disposed adjacent the pump 166 to determine pumping parameters. The electronics assembly 182 may further be operatively coupled to the valves 174, 176 and/or 178. The electronics assembly is preferably operatively coupled to the pump 166 (for example to the motor 170) for controlling the sampling operations. Optionally, the electronics assembly provides closed loop control of the pump 166.

Furthermore, the pump-out module 130*d* may include the second flow line 164, which may be fluidly coupled, selectively or otherwise, to the same parts or assemblies as the flowline 236. Alternatively, the second flowline 164 may be fluidly coupled to its own parts or assemblies to accomplish the same or similar functions as those that are fluidly coupled to the flowline 236. The pump-out module 130*d* may further include the hydraulic line 160, which may simply be fed through the pump-out module 130*d* and/or may be used to drive the pump 166, for example.

Figure 2D:
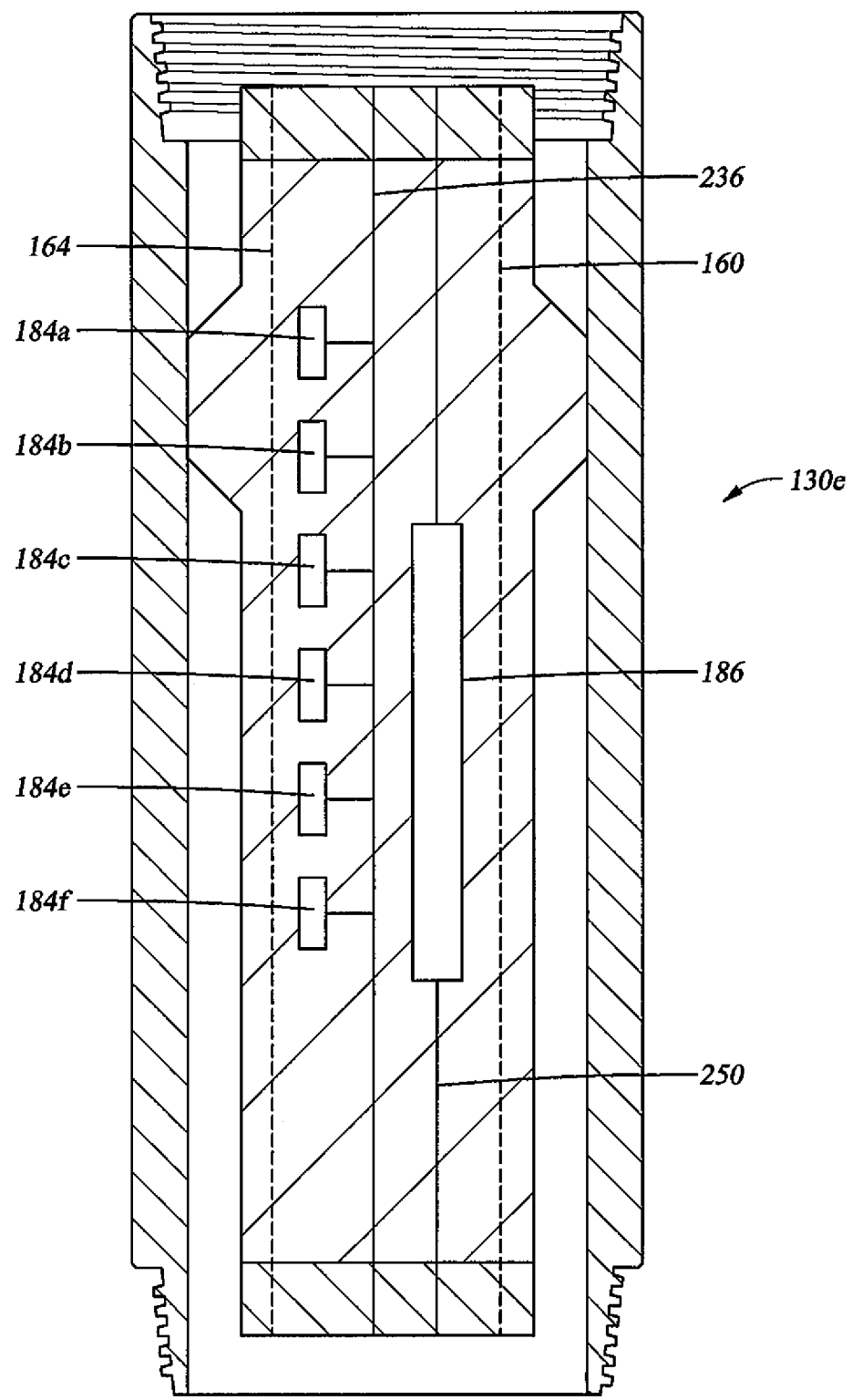
FIG. 2D is a schematic view, partially in cross-section, of an exemplary Downhole Fluid Analysis module for use in a drill string.

FIG. 2D shows a Downhole Fluid Analysis "DFA" module 130*e* that is usable with the other modules 130*a-i*. The DFA module 130*e* includes one or more fluid sensors 184 for determining various fluid parameters. For example, the DFA module 130*e* may include, but is not limited to a pressure sensor 184*a*, an optical sensor 184*b*, a viscosity sensor 184*c*, a density sensor 184*d*, a resistivity sensor 184*e* and a H2O sensor 184*f*. The sensors 184 are fluidly connected to the flowline 236, and may be communicably coupled to an electronics assembly 186 for collecting and communicating corresponding information. The electronics assembly 186 is also communicably coupled to the electrical line 250 for communicating data and/or power between other modules of the testing tool assembly 130. Furthermore, the DFA module 130*e* may include the second flow line 164, which may be fluidly coupled, selectively or otherwise, to the same parts or assemblies as the flowline 236. Alternatively, the second flowline 164 may be fluidly coupled to its own parts or assemblies to accomplish the same or similar functions as those that are fluidly coupled to the flowline 236. The DFA module 130*e* may further include the hydraulic line 160, which may simply be fed through the DFA module 130*e*.

FIGS. 3A-3C show several of the many possible configurations that can be achieved by combining one or more of the modules 130*a-i*. In addition, FIGS. 3A-3C depict additional modules 130, such as a control module 130*i*, a power module 130*f*, and the hydraulic module 130*h*. More specifically, the control module 130*i* may include one or more memories for storing information and data, one or more controllers adapted to control the other modules of the testing tool and to analyze the data, and to communicate with a surface operator (not shown). The power module 130*f* may generate power for the testing tool via a turbine and/or rechargeable battery (not shown), for example. The power generation mechanism may communicate power to the other modules via the electronics line 250, but may include a wholly separate line for providing the power. Although not necessary, the control module 130*i* and/or the power module 130*f* may include one or more fluid connections for passing through fluids (such as hydraulic fluid for example) between the modules 130. This provides additional modularity as the control and/or the power modules 130*i* and 130*f*, respectively, may be disposed between modules that require fluid connections.

The hydraulic module 130*h* may provide hydraulic power to one or more of the modules and their respective part or assemblies and, thus, requires at least one fluid line. For example, the tool may be connected and configured such that the hydraulic module 130*h* provides power to the pump 166, the probe 232 and/or the setting piston 150. In particular, the hydraulic module 130*h* may include a hydraulic compensation system, a pump to provide hydraulic power, control electronics, an electrical power source, sensors, valves (not shown) and other common parts found in hydraulic generation systems.

More specifically, FIG. 3A depicts BHA 100' having the drill bit 115 at the distal end thereof. Going in order from the bit 115 upwards is the probe module 130*b*, the DFA module 130*e*, the pump-out module 130*d*, the hydraulics module 130*h*, the sample carrier module 130*c*, the power generation module 130*f*, and the control module 130*i*, which may be connected using the hydraulic and electrical extender or connector 210 or any of the below described connectors. The connector 210 allows for the transfer of formation/wellbore fluid from one module 130 to another, and/or hydraulic fluid for activating system components. The electrical extender 210 may transfer signals and power between the modules 130, for sharing data between module or controlling operation from one master module. Even though not shown, the BHA 100' may include a telemetry tool for sending data to the surface and/or receiving downlink command from an operator, as is shown in FIG. 1.

In particular, one more flowlines (164, 236 of FIGS. 2A-2D), such as the sample and guard lines discussed previously, may extend from the probe 232 (disposed adjacent or closest to the bit 115), through the DFA module 130*e* for fluid analysis, and into the pump-out module 130*d* where the pump 166 (FIG. 2C) may provide pressure to the lines. Similarly, one more hydraulic lines (160 of FIGS. 2B-2D) may extend from the hydraulics module 130*h* into the pump-out module 130*d* for operating the pump 166 (FIG. 2C). Furthermore, the one more hydraulic lines 160 may extend through the DFA module 130*e* and into the probe module 130*b* for operating the probe 232 and or setting piston 150. The one or more data and/or power lines 250 may extend from the power generation module 130*f* and the control module 130*i*, to the remainder of the modules 130 of the BHA 100' to provide the necessary power to run the various assemblies and to communicate data between the modules 130.

One or more chassis housing may be used for packaging the various parts and assemblies of the modules 130*a-i* and the connectors 210 are arranged to allow drilling fluid passage from the surface to the drilling bit 115. With this configuration, various formation tests can be carried out as the well is drilled, while tripping or during wiper trips and provide real time information that can be used to steer the well, control the well, adapt the mud system, and characterize the reservoir, for example. In addition to performing the above and other tests, this modular system provides for common features between tools that can be combined to obtain tools with reduced size, and provides testing tools that can be configured according to the need of the job, such as pressure testing, fluid sampling, fluid analysis, and combinations, for example.

Furthermore, because of length limitations, the complexity of a single tool is very limited. With a modular tool, each module can still remain a reasonable length allowing the modules to be transported and handled on the rig. Thus, the length of the modules 130 should be such that they can be easily handled by the standard rig equipment, e.g. less than about 35 to 40 feet. Also a modular tool allows more features and more complexity to be built into the BHA to the client's benefit. In some cases, the DFA module 103e is preferably located before the pump-out module 130d, such as in oil based mud systems for example (FIG. 3A). In other cases, the DFA module 103e is preferably located after the pump-out module 130d, such as in water based mud systems for example (FIG. 3C).

FIGS. 3B and 3C depicts different configurations of the modules 130 to yield BHAs 100" and 100''', respectively. In particular, the BHA 100" of FIG. 3B includes a first probe module 130b disposed adjacent the bit 115 and a second probe module 130b disposed away from the bit 115. In this configuration, the BHA 100" is adaptable to conduct a sample and a pressure test simultaneously or be adaptable to conduct a sample or a pressure test with two probes at the same time. Similarly, the BHA 100" is adaptable to conduct an interference test, known to those of skill the art, which requires the infrastructure provided by the two probe modules 130b. The components for providing hydraulic power to the two probe modules may be regrouped in a single module 130h and shared between the two probe modules.

The BHA 100''' of FIG. 3C includes a probe module 130b disposed adjacent the bit 115, first and second DFA modules 130e disposed on each side of a pump out module 130d. In this configuration, the BHA 100''' is capable of analyzing the fluid after and before a pump, and detect segregation and/or breaking of emulsion that may occur in the pump module.

Figure 3D:
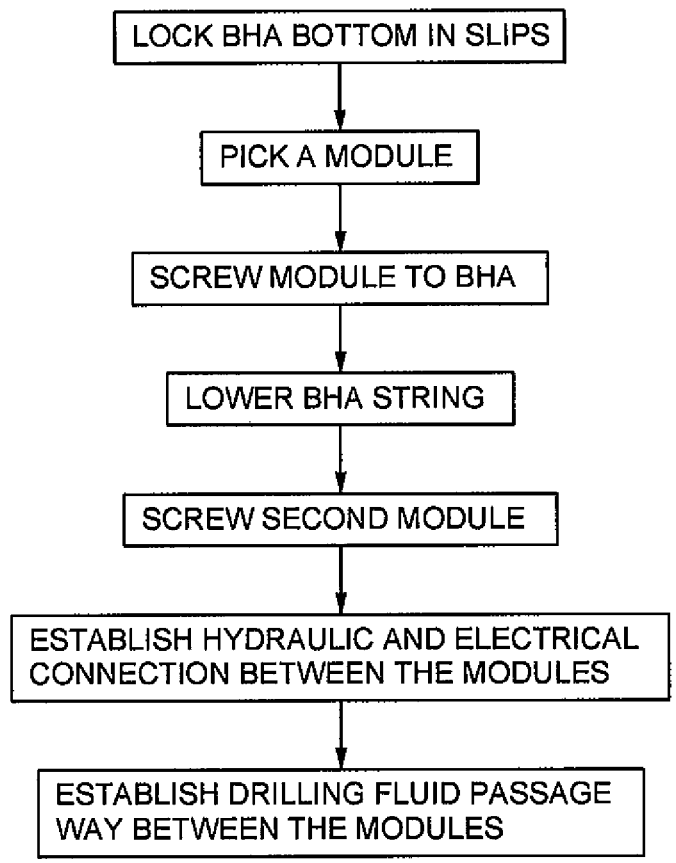
FIG. 3D is a flowchart illustration an operation of a modular tool.

In operation, the BHA may be assembled on a rig floor or adjacent the rig where real estate is limited. For example, as illustrated in FIG. 3D, a bottom of a BHA may be locked in slips. A module 130 may then be chosen, depending on the particular job or test to be run, and may then be screwed or otherwise attached to the BHA. The drill string is then lowered to a point where another module 130 may be added to the BHA. In adding or connecting the various modules 130, one or more hydraulic lines, one or more data lines and/or one or more fluid lines may be connected using one of the connectors described herein. In addition, while connecting the various modules 130, a passageway for drilling fluid is accomplished through the BHA.

Figure 4A:
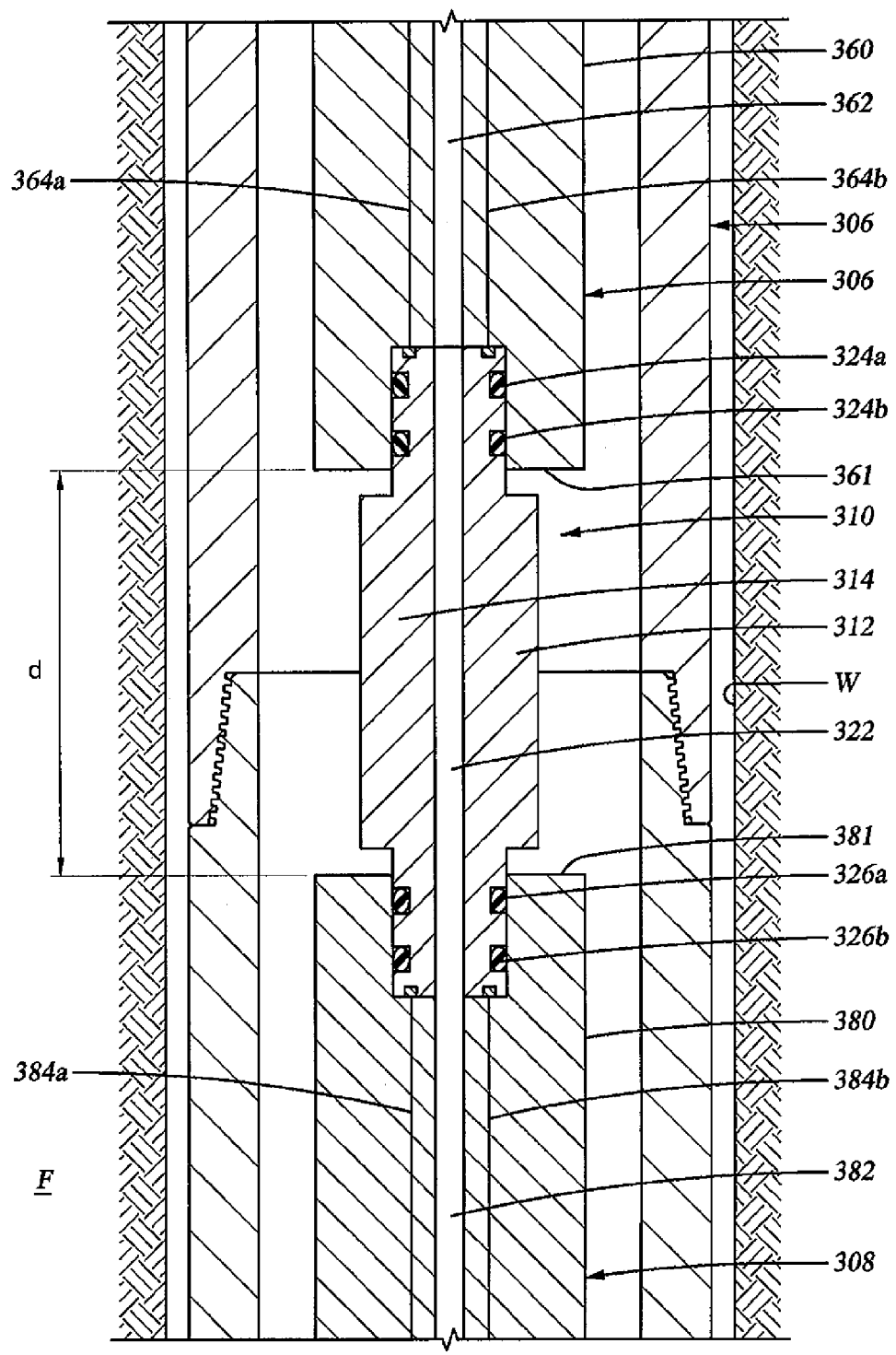
FIG. 4A is a schematic, cross-sectional representation of two components of a downhole tool string connected by a generic, modular connector.

FIG. 4A depicts a generic modular connector 310 being used for connecting the auxiliary flow lines 362, 382 and electrical lines 364a/b, 384a/b that extend through and terminate at or near opposing ends 361, 381 of two respective components 360, 380 of a downhole tool string (represented by connected drill collars 306, 308) disposed in a wellbore W penetrating a subsurface formation F. The components 360, 380 may be distinct downhole tools, and need not be discrete modules of a unitary tool as described above for FIG. 2.

The connector 310 comprises a body assembly 312 for fluidly-connecting the auxiliary flow lines 362, 382 and electrically-connecting the electrical lines 364a/b, 384a/b of the respective two components 360, 380. The body assembly may be substantially unitary, or include two or more complementing portions as described in the various embodiments below. The body assembly 312 defines at least one fluid conduit 322 for fluidly-connecting the auxiliary flow lines 362, 382 of the two components. Various other fluid conduit solutions are presented in the embodiments presented below. The body assembly is typically equipped with O-ring seals 324a/b, 326a/b for sealing the fluid connection across the ends 361, 381 of the connected components 360, 380. It will be appreciated that O-rings may be similarly used elsewhere for fluid flow integrity, as is known in the art. It will be further appreciated that, although O-rings are identified throughout this disclosure for facilitating seals across various fluid connections, other known sealing mechanisms (e.g., packing rings) may be employed to advantage. Additionally, in at least some embodiments, the connector body assembly will perform the function of pressure bulkhead that, e.g., prevents flooding of one of the interconnected components from propagating to the other interconnected component(s).

The body assembly is further equipped with at least one conductive pathway (not shown in FIG. 4A) for electrically-connecting the electrical lines 364a/b, 384a/b of the two components 360, 380. Such an electrical pathway is useful for conducting electrical signals through the body assembly, and may be defined in numerous ways as exemplified by the various embodiments described below.

The connector body assembly can be substantially made out of metal, with glass being employed to seal off connecting pins, contacts, etc. Alternatively, the connector body assembly could be made out of an insulating thermoplastic (e.g., PEEK™ thermoplastics), or it could be made of a suitable combination of metal, insulating thermoplastic material, and glass.

A length-adjusting assembly 314, which can incorporate a sleeve member (not shown), is further provided for adjusting the length of the body assembly 312 so as to accommodate differing distances d between the ends 361, 381 of the tool string components 360, 380 to be connected. As described further below, the body assembly 312 can include first and second members that are threadably interconnected (e.g., to each other or via a common sleeve or sub). In such instances, the length adjusting assembly 314 may be operative to permit or assist in the rotation of one or both of the first and second body assembly members so as to adjust the overall length of the body assembly. It will be appreciated that the operation of the length-adjusting assembly in such instances is simplified by the disposal of a substantial portion of the body assembly 312 axially between the opposing ends 361, 381 of the two components 360, 380, although this is not essential.

FIGS. 4B-14 depict various versions of a connector usable in connecting components such as proximate modules and/or tools of a downhole tool string. Each connector has a body assembly that generally comprises connectable first and second tubular members. The first and second tubular members can comprise respective tubular pin and box portions, and, in some embodiments, may comprise adjacent drill collars within a drill string as described below.

Figure 4B:
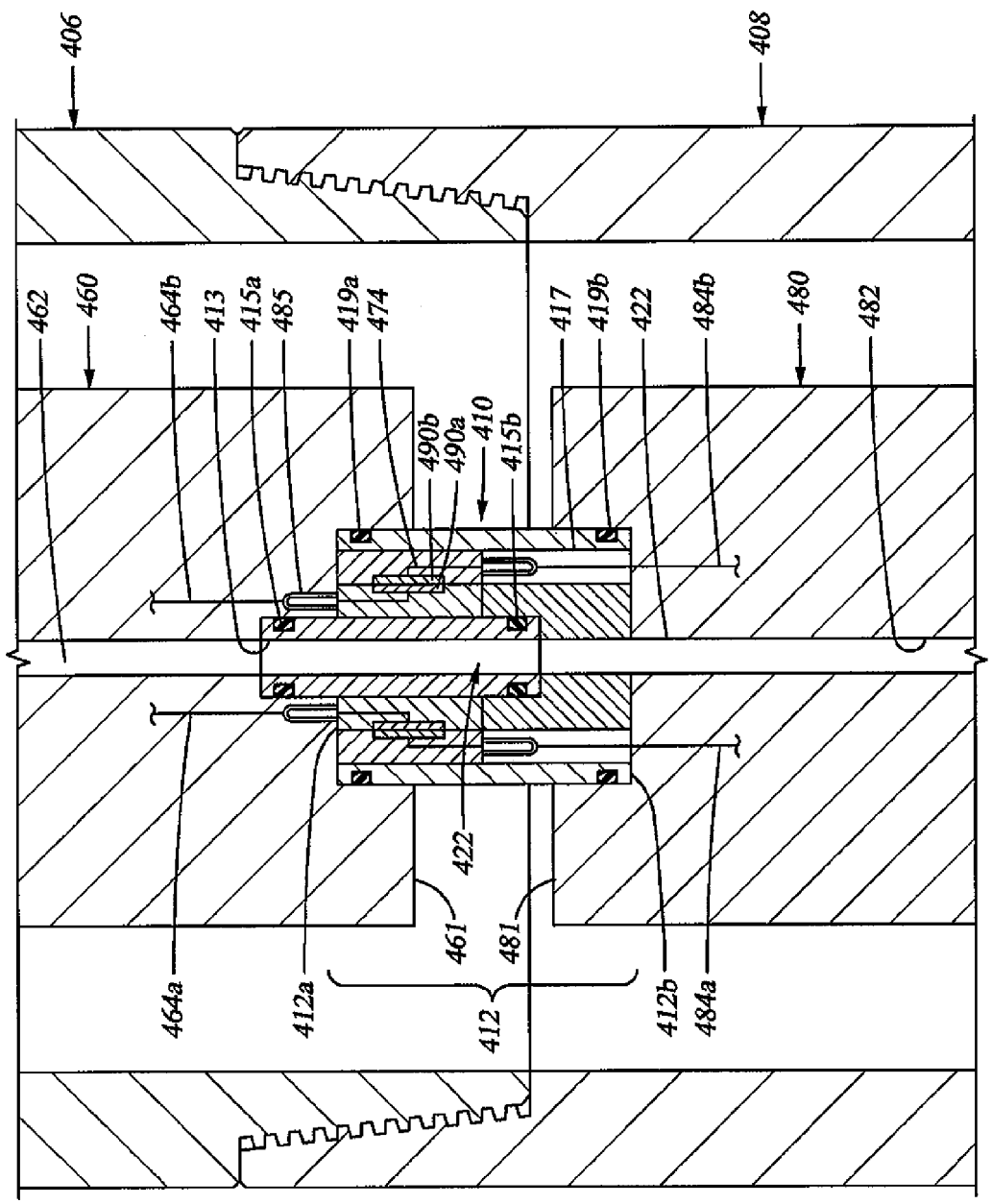
FIG. 4B is a schematic, cross-sectional view of two components of a downhole tool string connected by a connector having a central axially-oriented fluid conduit, and a central radially-oriented electrically-conductive pathway.

FIG. 4B is a sectional representation of a connector 410 having utility in the axially-oriented, centrally-located auxiliary flow lines 462, 482 of two components 460, 480 carried within respective drill collars 406, 408. The body assembly 412 of the connector 410 comprises connectable first and second tubular members, 412a/b. The first tubular member 412a is carried for movement with upper component 460 (which is moves with the upper drill collar 406), and defines a pin portion of the body assembly 412. The second tubular member 412b is carried for movement with the lower component 480 (which is moves with the lower drill collar 408), and defines a box portion of the body assembly 412. As the drill collars 406, 408 are made up by relative rotation therebetween, the box and pin portions of the body assembly 412 are also rotated and are driven into connective engagement so as to define an axially-oriented fluid conduit 422 for fluidly-connecting the auxiliary flow lines 462, 482 of the two components 460, 480. O-rings 415a/b are typically carried about a sleeve portion 413 of the first tubular member 412a, and O-rings 419a/b are typically carried about the sleeve portion 417 of the second tubular member 412b for sealing the fluid connection across the ends 461, 481 of the connected components 460, 480. It will be appreciated that O-rings or other sealing means may be similarly used elsewhere for fluid flow integrity, as is known in the art.

The first and second tubular members 412a, 412b also cooperate to define at least one conductive pathway 474 for electrically-connecting the electrical lines 464a/b, 484a/b of the two components 460, 480. The electrical lines are attached to the conductive pathway 474 of the body assembly 412 by way of pins 485, but may also be either soldered or crimped in place, among other known means of attachment. The conductive pathway 474 is radially oriented (i.e., it includes a segment that is radially oriented) across the first and second tubular members 412a, 412b by way of complementing radial (annular) electrical contacts 490a (inner), 490b (outer) carried by the pin and box portions of the respective first and second tubular members.

While an assembly for adjusting the length of the body assembly 412 is not shown in FIG. 4B, for the sake of simplicity, it should be appreciated by those skilled in the art that such an additional assembly will at least be desirable in a number of applications. Particular examples of such assemblies are discussed below in reference to FIGS. 7-8.

Figure 5:
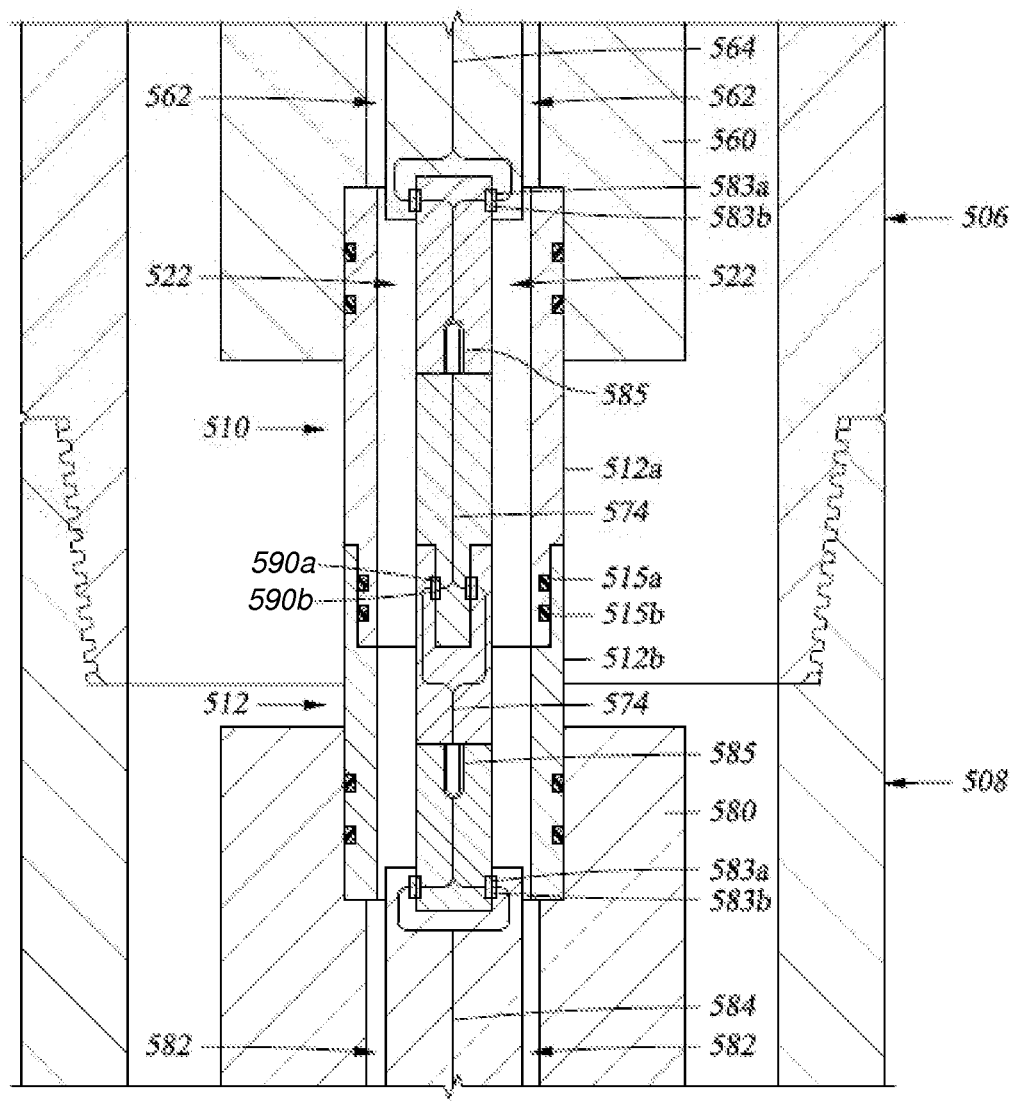
FIG. 5 is a schematic, cross-sectional view of two components of a downhole tool string connected by a connector having an axially-oriented, annular fluid conduit, and a central radially-oriented electrically-conductive pathway.

FIG. 5 is a sectional representation of a particular connector embodiment 510 having utility in the axially-oriented, annular auxiliary flow lines 562, 582 of two components 560, 580 carried within respective drill collars 506, 508. The body assembly 512 of the connector 510 comprises connectable first and second tubular members, 512a/b. The first tubular member 512a is carried for movement with upper component 560 (which is fixed to and moves with the upper drill collar 506), and defines a pin portion of the body assembly 512. The second tubular member 512b is carried for movement with the lower component 580 (which is fixed to and moves with the lower drill collar 508), and defines a box portion of the body assembly 512. Accordingly, as the drill collars 506, 508 are made up by relative rotation therebetween, the box and pin portions of the body assembly 512 are also rotated and are driven into connective engagement so as to define an axially-oriented, annular fluid conduit 522 for fluidly-connecting the auxiliary flow lines of the two components 560, 580. O-rings 515a/b are typically carried about the pin portion of the body assembly 512 for sealing the fluid connection across the first and second tubular members 512a/b. It will be appreciated that O-rings or other sealing means may be similarly used elsewhere for fluid flow integrity, as is known in the art.

The first and second tubular members 512a, 512b also cooperate to define at least one conductive pathway 574 for electrically-connecting the electrical lines 564, 584 of the two components 560, 580. The electrical lines 564, 584 are attached axially to the conductive pathway 574 of the body assembly 512 by way of complementing radial (annular) electrical contacts 583a (inner), 583b (outer) and pins 585 in a pin-to-socket design (similar to wet stab), but may also be either soldered or crimped in place, among other known means of attachment. The conductive pathway 574 is radially oriented (i.e., it includes a segment that is radially oriented) across the first and second tubular members 512a, 512b by way of complementing radial (annular) electrical contacts 590a (inner), 590b (outer) carried by the pin and box portions of the respective first and second tubular members 512a/b.

While an assembly for adjusting the length of the body assembly 512 is not shown in FIG. 5, for the sake of simplicity, it should be appreciated by those skilled in the art that such an additional assembly will at least be desirable in a number of applications. Particular examples of such assemblies are discussed below in reference to FIGS. 7-8.

Figure 6:
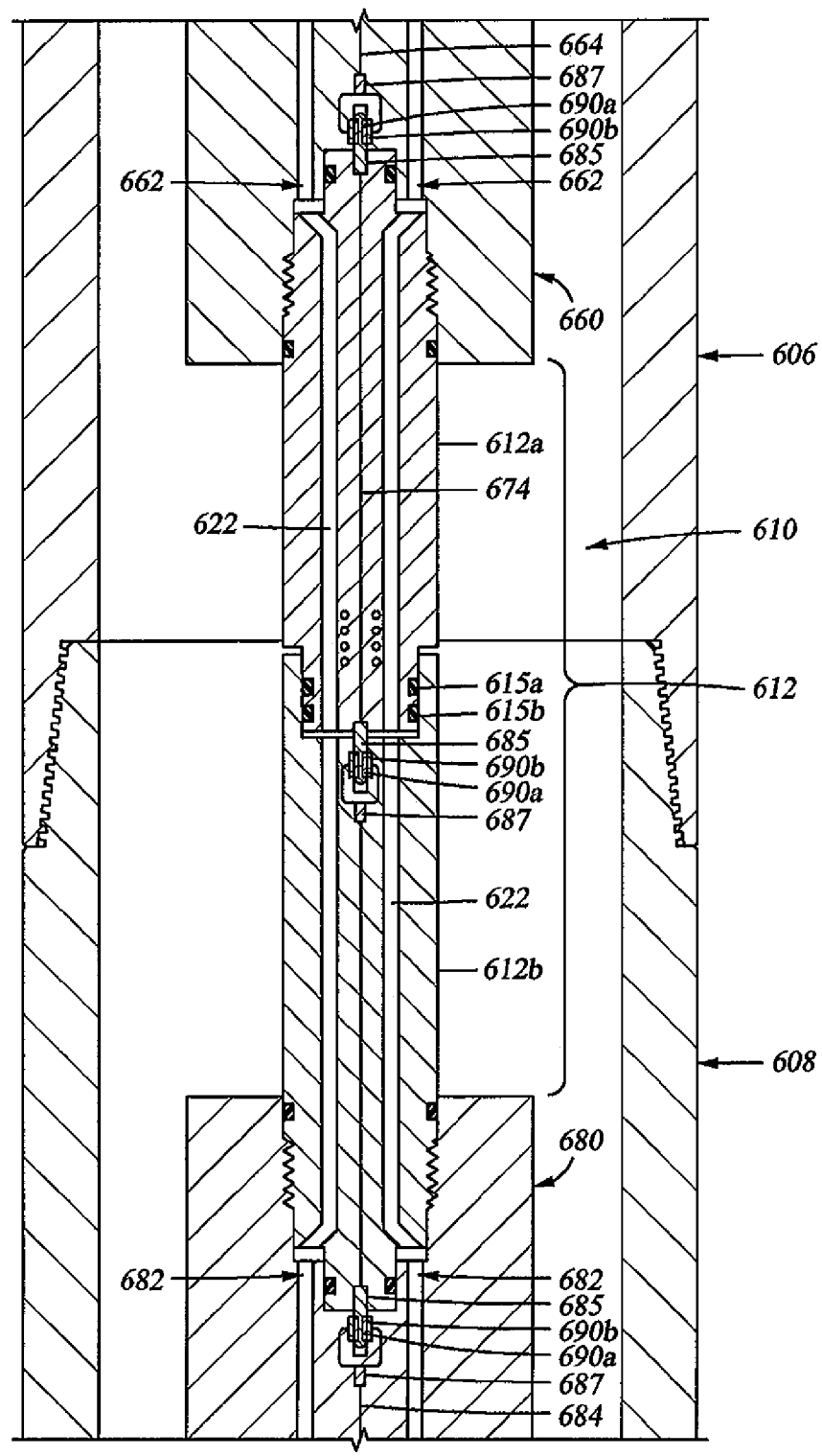
FIG. 6 is a schematic, cross-sectional view of two downhole components connected by a connector that is similar to the connector of FIG. 5, with the interface between the connector and the connected components being shown in greater detail.

FIG. 6 is a sectional representation of an alternate connector 610 having utility in the axially-oriented, annular auxiliary flow lines 662, 682 of two components 660, 680 carried within respective drill collars 606, 608. The body assembly 612 of the connector 610 comprises connectable first and second tubular members, 612a/b. The first tubular member 612a is carried for movement with upper component 660 (which is fixed to and moves with the upper drill collar 606), and defines a pin portion of the body assembly 612. The second tubular member 612b is carried for movement with the lower component 680, which is fixed to and moves with the lower drill collar 608), and defines a box portion of the body assembly 612. Accordingly, as the drill collars 606, 608 are made up by relative rotation therebetween, the box and pin portions of the body assembly 612 are also rotated and are driven into connective engagement so as to define an axially-oriented, annular fluid conduit 622 for fluidly-connecting the auxiliary flow lines 662, 682 of the two components 660, 680. O-rings 615a/b are typically carried about the pin portion of the body assembly 612 for sealing the fluid connection across the first and second tubular members 612a/b. It will be appreciated that O-rings or other sealing means may be similarly used elsewhere for fluid flow integrity, as is known in the art.

The first and second tubular members 612a, 612b also cooperate to define at least one conductive pathway 674 for electrically-connecting the electrical lines 664, 684 of the two components 660, 680. The electrical lines 664, 684 are attached axially to the conductive pathway 674 of the body assembly 612 by way of pins 685, 687 in pin-to-socket designs, but may also be either soldered or crimped in place, among other known means of attachment. The conductive pathway 674 is radially oriented (i.e., it includes a segment that is radially oriented) across the first and second tubular members 612a, 612b by way of upper and lower pairs of complementing radial (annular) electrical contacts 690a (inner), 690b (outer) carried by the pin and box portions of the respective first and second tubular members 612a/b.

While an assembly for adjusting the length of the body assembly 612 is not shown in FIG. 6, for the sake of simplicity, it should be appreciated by those skilled in the art that such an additional assembly will at least be desirable in a number of applications. Particular examples of such assemblies are discussed below in reference to FIGS. 7-8.

Figure 7:
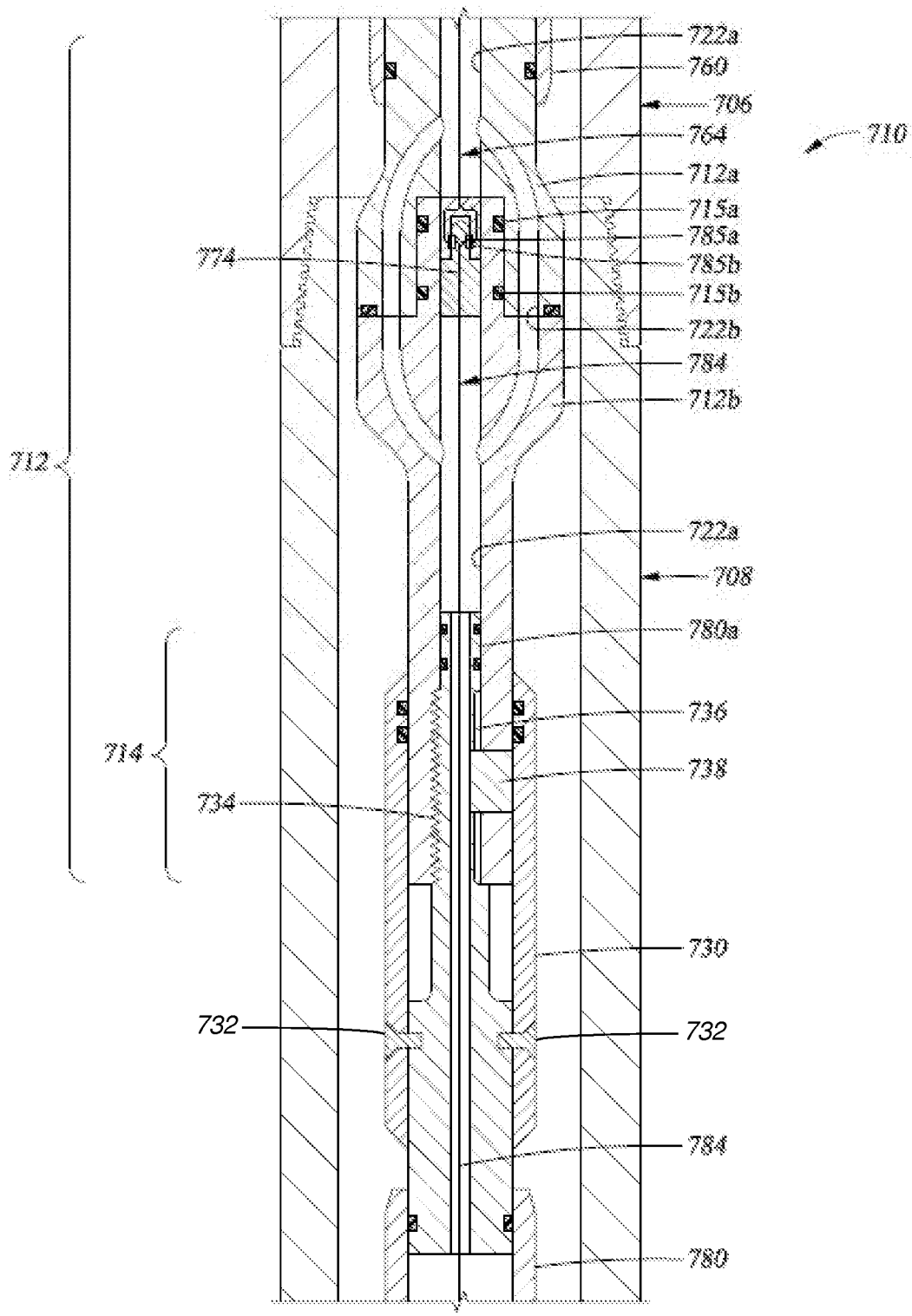
FIG. 7 is a schematic, cross-sectional view of two components of a downhole tool string connected by a connector having an assembly for adjusting the length of the connector.

FIG. 7 shows a sectional representation of a particular connector embodiment 710 having utility in the axially-oriented auxiliary flow lines (not shown) of two components 760, 780 carried within respective drill collars 706, 708. The body assembly 712 of the connector 710 comprises connectable first and second tubular members, 712a/b. The first tubular member 712a is carried for movement with upper component 760 (which moves with the upper drill collar 706), and defines a box portion of the body assembly 712. The second tubular member 712b is carried for movement with the lower component 780 (which moves with the lower drill collar 708), and defines a pin portion of the body assembly 712. Accordingly, as the drill collars 706, 708 are made up by relative rotation therebetween, the box and pin portions of the body assembly 712 are also rotated and are driven into connective engagement so as to define an axially-oriented, fluid conduit having linear portions 722a and annular portions 722b for fluidly-connecting the auxiliary flow lines (not shown) of the two components 760, 780. O-rings 715a/b are typically carried about the pin portion of the body assembly 712 for sealing the fluid connection across the first and second tubular members 712a/b. It will be appreciated that O-rings or other sealing means may be similarly used elsewhere for fluid flow integrity, as is known in the art.

The first and second tubular members 712a, 712b also cooperate to define at least one conductive pathway 774 for electrically-connecting the electrical lines 764, 784 of the two components 760, 780. The electrical lines 764, 784 extend partially through the fluid conduit 722a and are attached axially to the conductive pathway 774 of the body assembly 712 by way of a pin-to-socket design 785a/b (similar to wet stab), but may also be either soldered or crimped in place, among other known means of attachment. The conductive pathway 774 is radially oriented (i.e., it includes a segment that is radially oriented) across the first and second tubular members 712a, 712b by way of the complementing electrical socket 785a (inner) and electrical pin 785b (outer) carried by the box and pin portions of the respective first and second tubular members 712a/b.

FIG. 7 further shows, in some detail, an assembly 714 for adjusting the length of the connector. The process of adjusting the length essentially includes the steps of determining the distance between the opposing ends of the two components 760, 780, and shortening or lengthening the fluid connection between the auxiliary flow lines and the electrical connection between the electrical lines of the respective two components in accordance with the determined distance. The length-adjusting assembly 714 includes a sleeve 730 that is removably fixed about the lower component 780 by a plurality of locking screws 732. The lower component 780 has an upper, reduced-diameter portion 780a that fits within a lower portion (not separately numbered) of the second tubular member 712b of the connector body assembly 712. The lower component portion 780a and second tubular member 712b are equipped with complementing threaded surfaces for threadable engagement as referenced at 734. The second tubular member 712b includes a key slot 736 in the region of its threaded surface for receiving a key 738 which (in cooperation with the sleeve 730) prevents the second tubular member 712b from rotating. Thus, when the sleeve 730 and key 738 are removed, the second tubular member 712b is free to be rotated under an applied torque.

The length adjustment of the connector 710 preferably is carried out before the first and second tubular members 712a, 712b, the components 760, 780, and the length-adjusting assembly 714 are disposed within the drill collars 706, 708. Essentially, the lower component 780 is held against rotation while torque is applied to the second tubular member 712b, resulting in rotation of the second tubular member 712b relative to the lower component 780. Such relative rotation has the effect of moving the second tubular member 712b axially along (up or down) the lower component portion 780a as required for proper engagement between the second tubular member 712b and the first tubular member 712a when both members are mounted within their respective drill collars 706, 708 and made up by relative rotation between these drill collars. The length adjustment is therefore carried out by way of manipulating the position of the second tubular member 712b along the lower component 780. The first tubular member 712a is typically held in one position along the upper component 760, although the electrical socket 785a may be spring-biased downwardly to facilitate its engagement with electrical pin 785b. It will be appreciated that O-rings or other sealing means may be used in various locations (not numbered) for fluid flow integrity.

Figure 8:
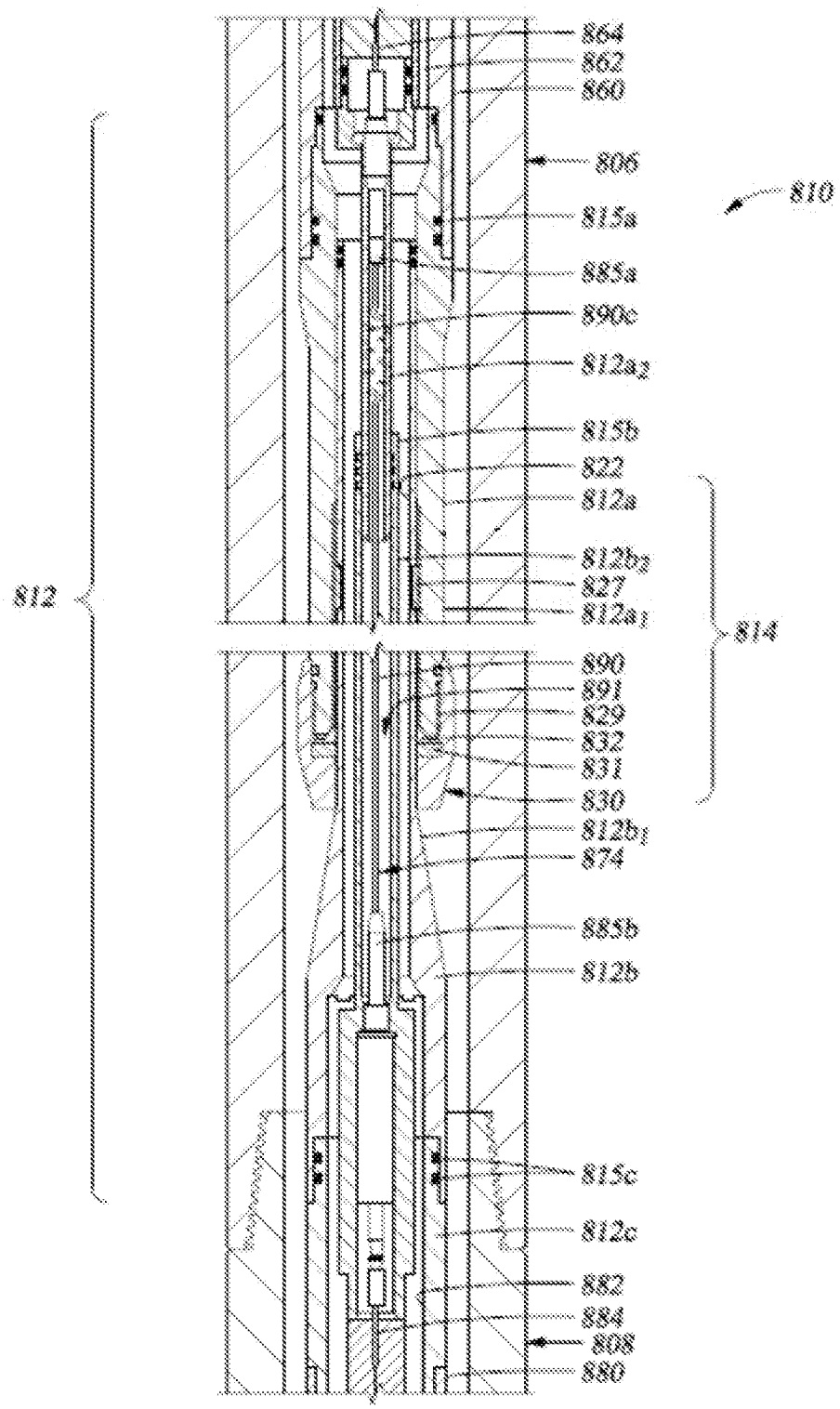
FIG. 8 is a schematic, cross-sectional view of two components of a downhole tool string connected by a connector provided with an alternate assembly for adjusting the length of the connector.

FIG. 8 shows a sectional representation of an alternate connector 810 having utility in the axially-oriented, annular auxiliary flow lines 862, 882 of two components 860, 880 carried within respective drill collars 806, 808. The body assembly 812 of the connector 810 comprises connectable first, second, and third tubular members, 812a/b/c. The first and second tubular members 812a/b are carried for movement with upper component 860 which is fixed to and moves with an upper drill collar 806. The first tubular member 812a include concentric tubular portions that define an outer box portion 812a1 and an inner pin portion 812a2 of the body assembly 812. The second tubular member 812b is slidably connected to the third tubular member 812c (i.e., permitting relative rotation therebetween) using O-rings 815c, and includes concentric tubular portions that define an outer pin portion 812b1 and an inner box portion 812b2 of the body assembly 812. The third tubular member 812c is carried for movement with the lower component 880 which is fixed to and moves with a lower drill collar 808. Accordingly, as the upper and lower drill collars 806, 808 are made up by relative rotation therebetween, the box and pin portions of the body assembly 812 (defined by the second and third tubular members 812b/c, respectively) are also rotated and are driven into connective engagement so as to define an axially-oriented, annular fluid conduit 822 for fluidly-connecting the auxiliary flow lines 862, 882 of the two components 860, 880. O-ring sets 815a/b are typically carried about the respective pin portions of the body assembly 812 for sealing the fluid connection across the first and second tubular members 812a/b. It will be appreciated that O-rings or other sealing means may be similarly used elsewhere for fluid flow integrity, as is known in the art.

The first and second tubular members 812a, 812b also cooperate to define at least one conductive pathway 874 for electrically-connecting the electrical lines 864, 884 of the two components 860, 880. The electrical lines 864, 884 are attached axially to the conductive pathway 874 of the body assembly 812 by way of respective upper/lower wet stabs 885a/b, but may also be either soldered or crimped in place, among other known means of attachment. The conductive pathway 874 is partially provided by an overlength of conductive wire(s) 890 (note the coiled region 890c) within a central conduit 891 defined by the first and second tubular members 812a, 812b.

FIG. 8 further shows, in some detail, an alternate assembly 814 for adjusting the length of the connector 810. The process of adjusting the length essentially includes the steps of determining the distance between the opposing ends of the two components 860, 880, and shortening or lengthening the fluid connection between the auxiliary flow lines and the electrical connection between the electrical lines of the respective two components in accordance with the determined distance. The length-adjusting assembly 814 includes a collar or cap 830 that is lockable about the lower component 880 by way of a lock washer 831 and wedge ring 832 that are drivable by rotation of the collar 830 (see threaded region 829) into locking engagement with a lower shoulder of the outer box portion 812a1. A split, externally-threaded ring 827 is carried about a reduced-diameter portion of the outer pin portion 812b1. The outer pin portion 812b1 and ring 827 fit within the outer box portion 812a1 which is equipped with internal threads that complement the threads of the ring 827. Thus, when the wedge ring 832 is backed off from locking engagement with external box portion 812a1, the first tubular member 812a is free to be rotated under an applied torque.

The length adjustment of the connector 810 preferably is carried out before the first, second, and third tubular members 812a/b/c, the components 860, 880, and the length-adjusting assembly 814 are disposed within the drill collars 806, 808. The application of torque to the first tubular member 812a will result in rotation of the first tubular member 812a relative to the threaded ring 827. Such relative rotation has the effect of moving the second tubular member 812b axially along (up or down) the first tubular component 812*a* as required for proper engagement between the second tubular member 812*b* and the third tubular member 812*c* when both members are mounted within their respective drill collars 806, 808 and made up by relative rotation between these drill collars. The length adjustment is therefore carried out by way of manipulating the position of the second tubular member 812*b* along the first tubular member 812*a*. The third tubular member 812*c* is typically held in one position along the lower component 880.

The embodiments illustrated in FIGS. 7-8 employ length-adjusting assemblies 714, 814 that facilitate relative rotation generally between first and second tubular members to adjust the length of the body assemblies 712, 812. It will be appreciated by those having ordinary skill in the art, however, that other length-adjusting assemblies may be employed to advantage. Examples include assemblies that facilitate relative sliding, telescoping, or other translatory motion between first and second tubular members as appropriate to adjust the length of the connector body assembly.

Figure 9:
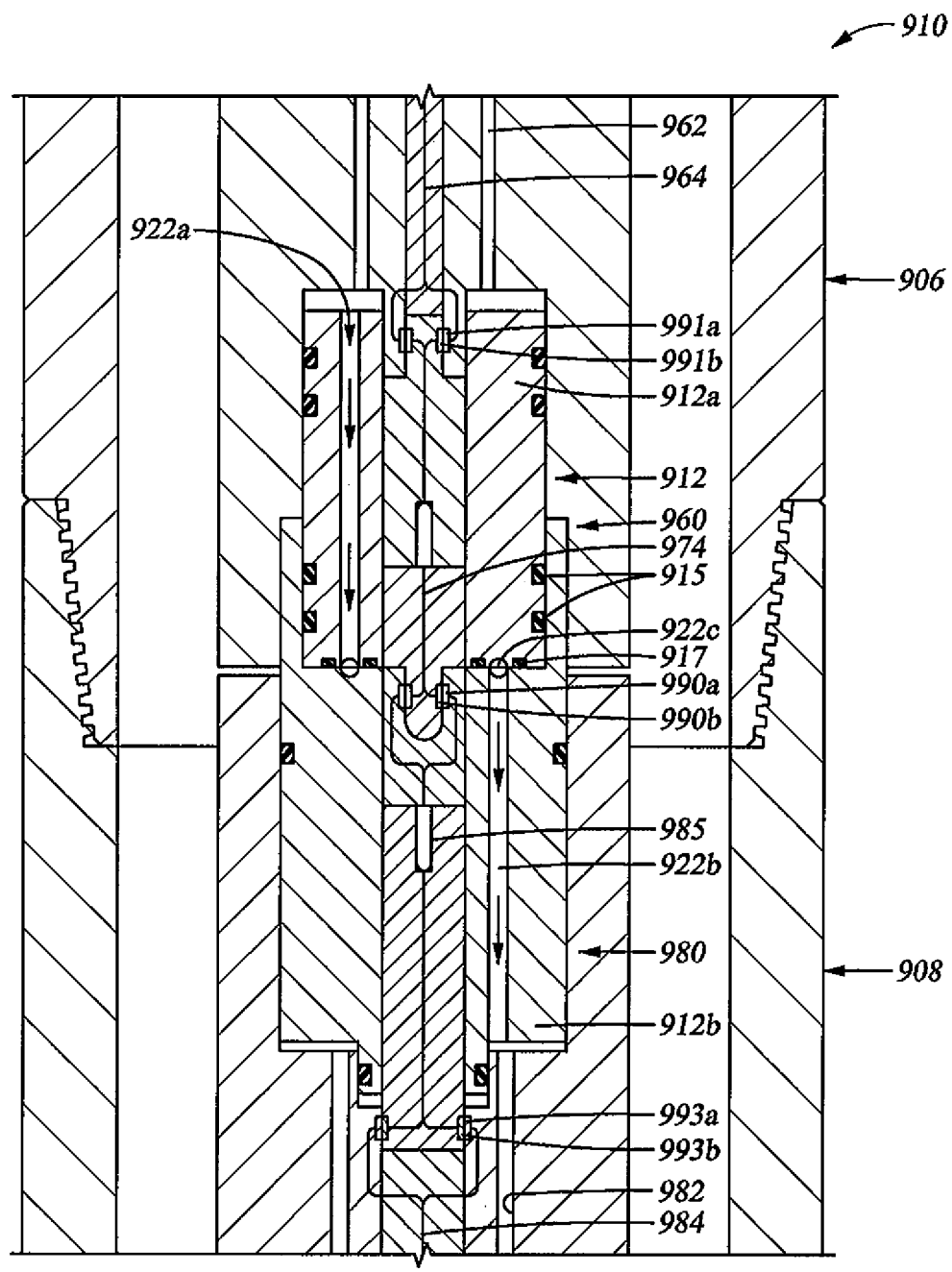
FIG. 9 is a schematic, cross-sectional view of two components of a downhole tool string connected by a connector having an inner radially-symmetrical fluid conduit, and a central radially-oriented electrically-conductive pathway.

FIG. 9 is a sectional representation of an alternate connector 910 having utility in the axially-oriented, annular auxiliary flow lines 962, 982 of two components 960, 980 carried within respective drill collars 906, 908. The body assembly 912 of the connector 910 comprises connectable first and second tubular members, 912*a/b*. The first tubular member 912*a* is carried for movement with upper component 960 (which is fixed to and moves with the upper drill collar 906), and defines a pin portion of the body assembly 912. The second tubular member 912*b* is carried for movement with the lower component 980 (which is fixed to and moves with the lower drill collar 908), and defines a box portion of the body assembly 912. Accordingly, as the drill collars 906, 908 are made up by relative rotation therebetween, the box and pin portions of the body assembly 912 are also rotated and are driven into connective engagement so as to define an axially-oriented, fluid conduit 922*a/b* having an annular space 922*c* across the first and second tubular members 912*a/b* (i.e., at the interface of the connected members) for fluidly-connecting the auxiliary flow lines 962, 982 of the two components 960, 980. O-rings 915 are typically carried about the pin portion of the body assembly 912, and one or more face seals 917 are typically disposed about the end portions of the first and second tubular members 912*a/b* that define the annular space 922*c*, for sealing the fluid connection across the first and second tubular members 912*a/b*. It will be appreciated that O-rings or other sealing means may be similarly used elsewhere for fluid flow integrity, as is known in the art.

The first and second tubular members 912*a*, 912*b* also cooperate to define at least one conductive pathway 974 for electrically-connecting the electrical lines 964, 984 of the two components 960, 980. The electrical lines 964, 984 are attached axially to the conductive pathway 974 of the body assembly 912 by way of complementing upper radial (annular) electrical contacts 991*a* (inner), 991*b* (outer), complementing lower radial (annular) electrical contacts 993*a* (inner), 993*b* (outer), pins 985 and a pin-to-socket design (similar to wet stab), but may also be either soldered or crimped in place, among other known means of attachment. More particularly, the conductive pathway 974 is radially oriented (i.e., it includes a segment that is radially oriented) across the first and second tubular members 912*a*, 912*b* by way of upper and lower pairs of complementing radial (annular) electrical contacts 990*a* (inner), 990*b* (outer) carried by the pin and box portions of the respective first and second tubular members 912*a/b*.

While an assembly for adjusting the length of the body assembly 912 is not shown in FIG. 9, for the sake of simplicity, it should be appreciated by those skilled in the art that such an additional assembly will at least be desirable in a number of applications. Particular examples of such assemblies are discussed above in reference to FIGS. 7-8.

Figure 10:
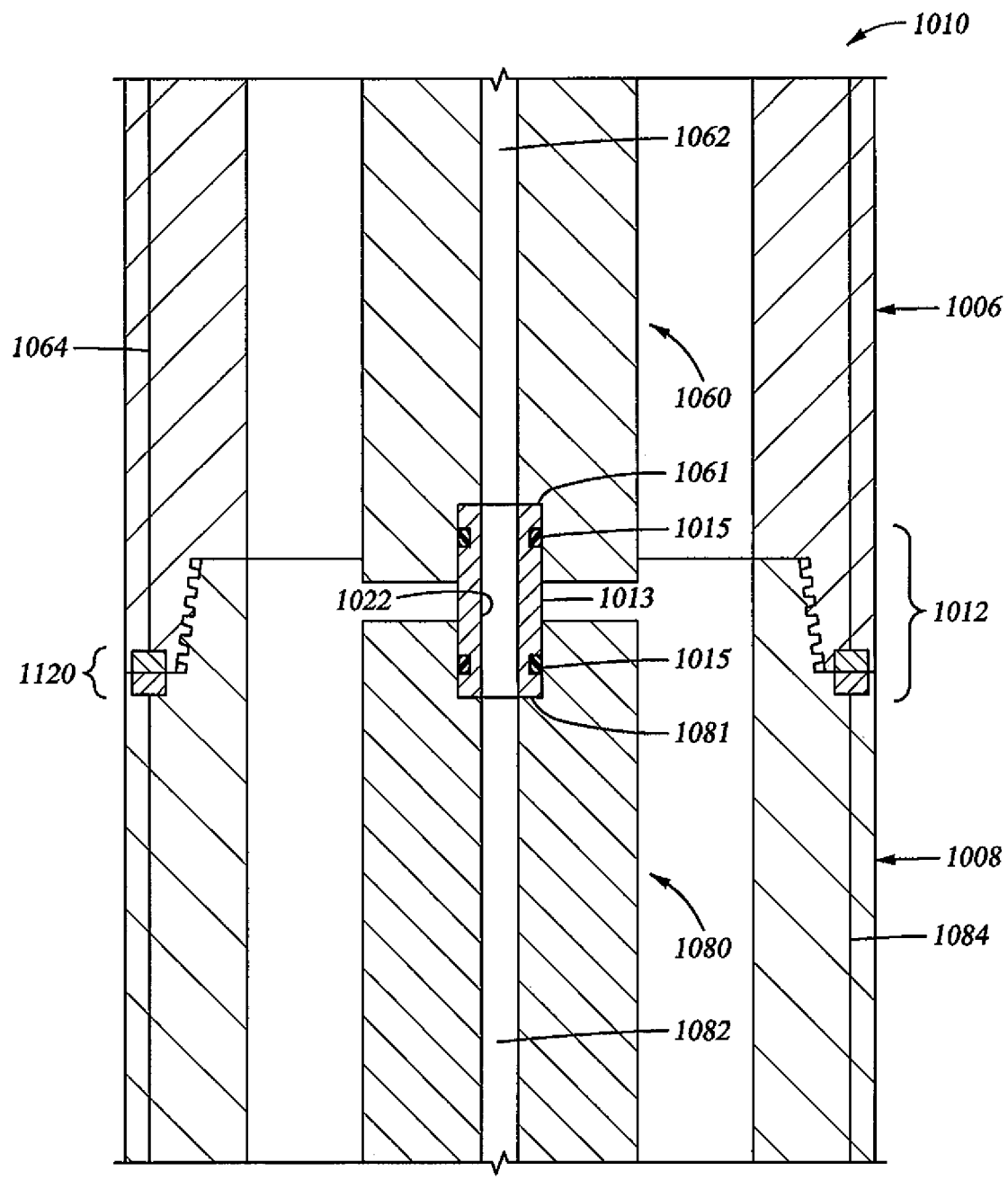
FIG. 10 is a schematic, cross-sectional view of two components of a downhole tool string connected by a connector having a central axially-oriented fluid conduit, and a non-central axially-oriented electrically-conductive pathway.

FIG. 10 is a sectional representation of an alternate connector 1010 having utility in the axially-oriented auxiliary flow lines 1062, 1082 of two components 1060, 1080 carried within respective drill collars 1006, 1008. The body assembly 1012 of the connector 1010 comprises a single hydraulic stabber 1013 equipped with O-rings 1015. The hydraulic stabber 1013 is equipped with two or more O-rings 1015 for fluidly engaging both of the components 1060, 1080 (which move with the respective drill collars 1006, 1008). Accordingly, as the drill collars 1006, 1008 are made up by relative rotation therebetween, the components 1060, 1080 are also rotated and are driven into fluid engagement, via the hydraulic stabber 1013 and central bores 1061, 1081 in the respective ends thereof, so as to define an axially-oriented fluid conduit 1022 for fluidly-connecting the auxiliary flow lines 1062, 1082 of the two components 1060, 1080. It will be appreciated that O-rings or other sealing means may be similarly used elsewhere for fluid flow integrity, as is known in the art.

The body assembly 1012 of the connector 1010 further comprises a conductive pathway 1120 for electrically-connecting the electrical lines 1064, 1084 of the drill collars 1006, 1008 associated with the two respective components 1060, 1080.

Figure 11A:
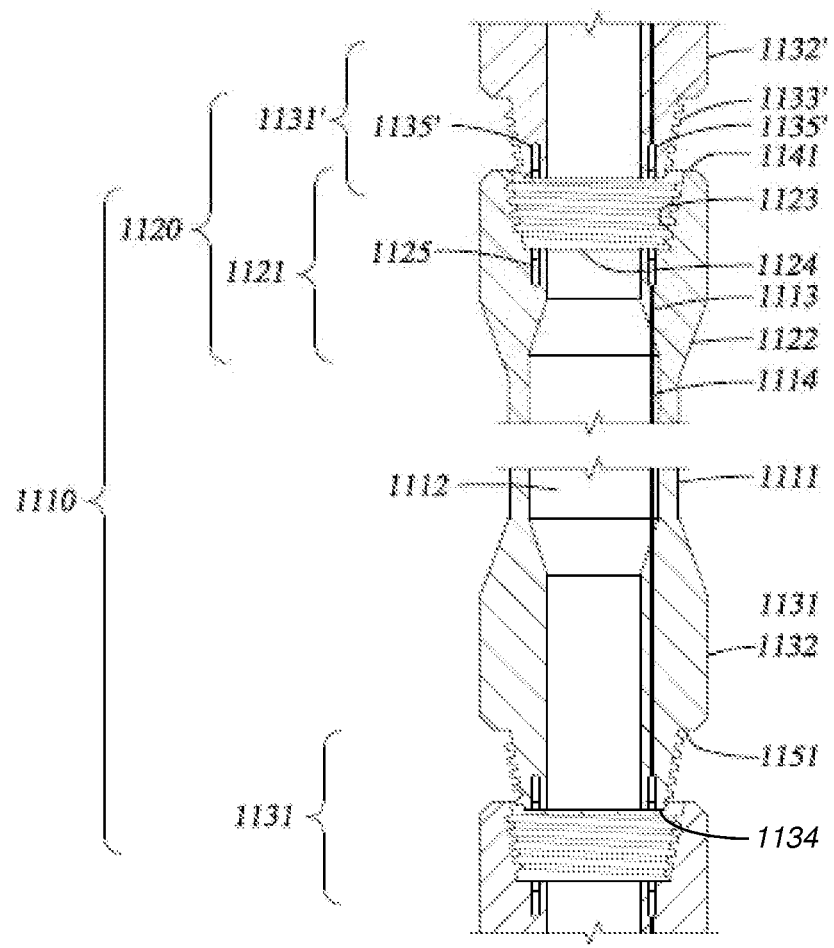
FIGS. 11A-B are schematic, cross-sectional views of a portion of a wired drill pipe system employed by the axially-oriented electrically-conductive connector pathway of FIG. 10.
Figure 11B:
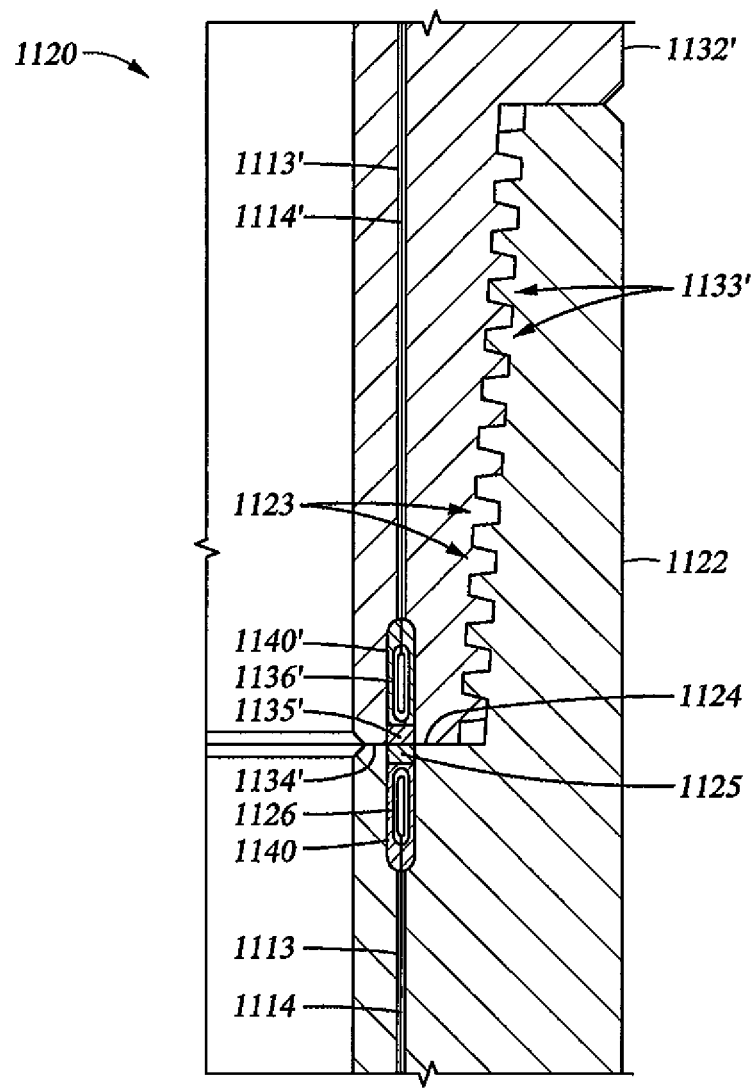

FIGS. 11A-B are detailed, sectional representations of axially-oriented electrically-conductive pathway 1120 of FIG. 10. The wired drill pipe (WDP) joints 1110 represent a suitable configuration for implementing the electrically-conductive pathway 1120 into drill collars 1006, 1008. The joints 1110 are similar to the type disclosed in U.S. Pat. No. 6,641,434 by Boyle et al., assigned to the assignee of the present disclosure, and utilize communicative couplers—particularly inductive couplers—to transmit signals across the WDP joints. An inductive coupler in the WDP joints, according to Boyle et al., comprises a transformer that has a toroidal core made of a high permeability, low loss material such as Supermalloy (which is a nickel-iron alloy processed for exceptionally high initial permeability and suitable for low level signal transformer applications). A winding, consisting of multiple turns of insulated wire, coils around the toroidal core to form a toroidal transformer. In one configuration, the toroidal transformer is potted in rubber or other insulating materials, and the assembled transformer is recessed into a groove located in the drill pipe connection.

More particularly, the WDP joint 1110 is shown to have communicative couplers 1121, 1131—particularly inductive coupler elements—at or near the respective end 1141 of box end 1122 and the end 1134 of pin end 1132 thereof. A first cable 1114 extends through a conduit 1113 to connect the communicative couplers, 1121, 1131 in a manner that is described further below.

The WDP joint 1110 is equipped with an elongated tubular body 1111 having an axial bore 1112, a box end 1122, a pin end 1132, and a first cable 1114 running from the box end 1122 to the pin end 1132. A first current-loop inductive coupler element 1121 (e.g., a toroidal transformer) and a similar second current-loop inductive coupler element 1131 are disposed at the box end 1122 and the pin end 1132, respectively. The first current-loop inductive coupler element 1121, the second current-loop inductive coupler element 1131, and the first cable 1114 collectively provide a communicative conduit across the length of each WDP joint. An inductive coupler (or communicative connection) 1120 at the coupled interface between two WDP joints is shown as being constituted by a first inductive coupler element 1121 from WDP joint 1110 and a second current-loop inductive coupler element 1131' from the next tubular member, which may be another WDP joint. Those skilled in the art will recognize that, in some embodiments of the present disclosure, the inductive coupler elements may be replaced with other communicative couplers serving a similar communicative function, such as, e.g., direct electrical-contact connections of the sort disclosed in U.S. Pat. No. 4,126,848 by Denison.

FIG. 11B depicts the inductive coupler or communicative connection 1120 of FIG. 11A in greater detail. Box end 1122 includes internal threads 1123 and an annular inner contacting shoulder 1124 having a first slot 1125, in which a first toroidal transformer 1126 is disposed. The toroidal transformer 1126 is connected to the cable 1114. Similarly, pin-end 1132' of an adjacent wired tubular member (e.g., another WDP joint) includes external threads 1133' and an annular inner contacting pipe end 1134' having a second slot 1135', in which a second toroidal transformer 1136' is disposed. The second toroidal transformer 1136' is connected to a second cable 1114' of the adjacent tubular member 9a. The slots 1125 and 1135' may be clad with a high-conductivity, low-permeability material (e.g., copper) to enhance the efficiency of the inductive coupling. When the box end 1122 of one WDP joint is assembled with the pin end 1132' of the adjacent tubular member (e.g., another WDP joint), a communicative connection is formed. FIG. 11B thus shows a cross section of a portion of the resulting interface, in which a facing pair of inductive coupler elements (i.e., toroidal transformers 1126, 1136') are locked together to form a communicative connection within an operative communication link. This cross-sectional view also shows that the closed toroidal paths 1140 and 1140' enclose the toroidal transformers 1126 and 1136', respectively, and that the conduits 1113 and 1113' form passages for internal electrical cables 1114 and 1114' (having use as the conductors 1064, 1084 of FIG. 10) that connect the two inductive coupler elements disposed at the two ends of each WDP joint.

The above-described inductive couplers incorporate an electric coupler made with a dual toroid. The dual-toroidal coupler uses inner shoulders of the pin and box ends as electrical contacts. The inner shoulders are brought into engagement under extreme pressure as the pin and box ends are made up, assuring electrical continuity between the pin and the box ends. Currents are induced in the metal of the connection by means of toroidal transformers placed in slots. At a given frequency (for example 100 kHz), these currents are confined to the surface of the slots by skin depth effects. The pin and the box ends constitute the secondary circuits of the respective transformers, and the two secondary circuits are connected back to back via the mating inner shoulder surfaces.

While FIGS. 11A-B depict certain communicative coupler types, it will be appreciated by one of skill in the art that a variety of couplers may be used for communication of signals across interconnected tubular members. For example, such systems may involve magnetic couplers, such as those described in International Patent Application No. WO 02/06716 to Hall et al. Other systems and/or couplers are also envisioned.

Additionally, while an assembly for adjusting the length of the body assembly 1012 is not shown in FIG. 10 or FIGS. 11A-B, for the sake of simplicity, it should be appreciated by those skilled in the art that such an additional assembly will at least be desirable in a number of applications. Particular examples of such assemblies are discussed above in reference to FIGS. 7-8.

Figure 12:
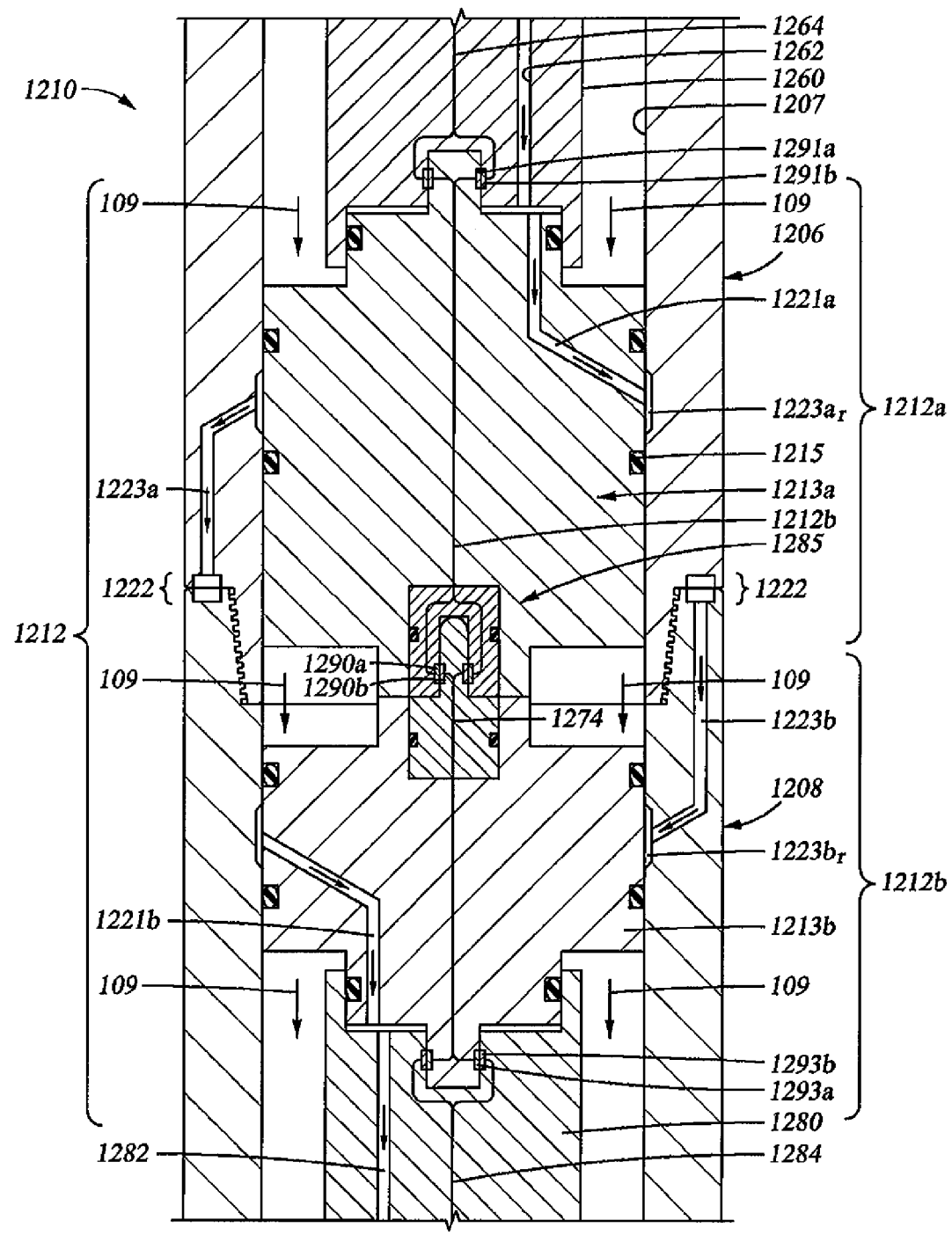
FIG. 12 is a schematic, cross-sectional view of two components of a downhole tool string connected by a connector having an outer radially-symmetrical fluid conduit, and a central radially-oriented electrically-conductive pathway.

FIG. 12 is a sectional representation of an alternate connector 1210 having utility in the axially-oriented, annular auxiliary flow lines 1262, 1282 of two components 1260, 1280 carried within respective drill collars 1206, 1208. The body assembly 1212 of the connector 1210 comprises connectable first and second subassemblies, 1212a/b.

The first subassembly 1212a is carried for movement with the upper component 1260, and includes the drill collar 1206 and an upper mandrel 1213a fixed (e.g., by threaded engagement) within the drill collar 1206. The upper mandrel 1213a includes a flowline 1221a that extends axially through the mandrel (from the upper connected component, 1260) before jutting outwardly to engage the annular region 1223ar of a flowline 1223a within the drill collar 1206. As the first body subassembly 1212a is made up by the engagement of the upper mandrel 1213a within the upper drill collar 1206 (e.g., by threaded rotation therebetween), the radially-jutting end of the flowline 1221a will be placed in vertical engagement with the annular region 1223ar of the flowline 1223a to establish an upper flowlink.

The second subassembly 1212b is carried for movement with the lower component 1280, and includes the drill collar 1208 and a lower mandrel 1213b fixed (e.g., by threaded engagement) within the drill collar 1208. The lower mandrel 1213b includes a flowline 1221b that extends axially through the mandrel (from the lower connected component, 1280) before jutting outwardly to engage the annular region 1223b$_r$ of a flowline 1223b within the drill collar 1208. As the second body subassembly 1212b is made up by the engagement of the lower mandrel 1213b within the lower drill collar 1208 (e.g., by threaded rotation therebetween), the radially-jutting end of the flowline 1221b will be placed in vertical engagement with the annular region 1223b$_r$ of the flowline 1223b to establish a lower flowlink.

As the drill collars 1206, 1208 are made up by relative rotation therebetween. Drilling mud 109 passes through passage 1207 extending through drill collars 1206 and 1208 as indicated by the arrows. The first and second subassemblies 1212a/b of the body assembly 1212 are also rotated and are driven into connective engagement so as to define an outer radially-oriented (more particularly, a radially-symmetrical) fluid conduit 1222 for fluidly-connecting the upper and lower flowlinks of the respective first and second boy subassemblies. This process fluidly interconnects the two components 1260, 1280. O-rings 1215 are typically carried about upper and lower mandrels 1213a/b for sealing the fluid connection across the first and second body subassemblies 1212a/b. It will be appreciated that O-rings or other sealing means may be similarly used elsewhere for fluid flow integrity, as is known in the art.

The first and second body subassemblies 1212a, 1212b also cooperate to define at least one conductive pathway 1274 for electrically-connecting the electrical lines 1264, 1284 of the two components 1260, 1280. The electrical lines 1264, 1284 are attached axially to the conductive pathway 1274 of the body assembly 1212 by way of complementing upper radial (annular) electrical contacts 1291a (inner), 1291b (outer), complementing lower radial (annular) electrical contacts 1293a (inner), 1293b (outer), a pin-to-socket design 1285 (similar to wet stab), and complementing radial (annular) electrical contacts 1290a (inner), 1290b (outer). It will be appreciated that other known means of electrical attachment may be employed. The conductive pathway 1274 is radially oriented (i.e., it includes a segment that is radially oriented)

across the first and second body subassemblies 1212a, 1212b by way of upper and lower pairs of complementing radial (annular) electrical contacts 1290a (inner), 1290b (outer) carried by the respective pin and socket components of the design 1285.

While an assembly for adjusting the length of the body assembly 1212 is not shown in FIG. 12, for the sake of simplicity, it should be appreciated by those skilled in the art that such an additional assembly will at least be desirable in a number of applications. Particular examples of such assemblies are discussed above in reference to FIGS. 7-8.

Figure 13:
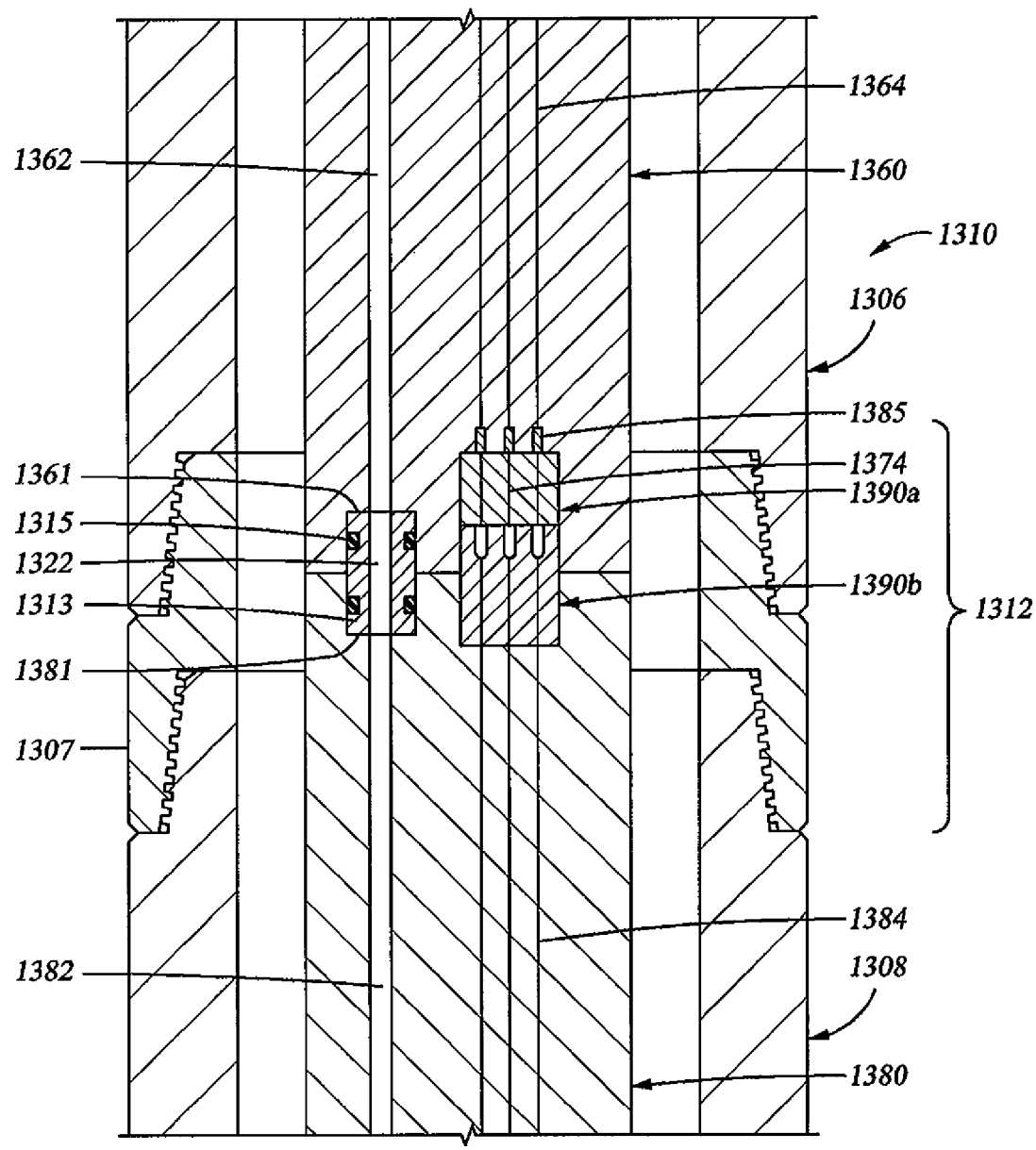
FIG. 13 is a schematic, cross-sectional view of two components of a downhole tool string connected by a connector having a non-central axially-oriented fluid conduit, and an axially-oriented electrically-conductive pathway.

FIG. 13 is a sectional representation of an alternate connector 1310 having utility in the axially-oriented, annular auxiliary flow lines 1362, 1382 of two components 1360, 1380 carried within respective drill collars 1306, 1308. The body assembly 1312 of the connector 1310 comprises a single hydraulic stabber 1313 equipped with O-rings 1315. The hydraulic stabber 1313 is equipped with two or more O-rings 1315 for fluidly engaging both of the components 1360, 1380 (which are fixed to and move with the respective drill collars 1306, 1308). It will be appreciated that O-rings or other sealing means may be similarly used elsewhere for fluid flow integrity, as is known in the art.

A connecting sub 1307 is disposed between the drill collars 1306, 1308 for interconnecting the drill collars. The sub 1307 employs pin and box end thread sets that are adapted for engaging the respective thread sets of the opposing ends of the drill collars 1306, 1308, and for drawing both of the drill collars towards the sub 1307 into threaded engagement as the sub is rotated. Thus, rotation of the sub 1307 after its threads have initially engaged the threads of the respective drill collars—and the drill collars are held against rotation at the drilling ring floor (e.g., in a conventional manner)—will effect the make-up of the drill collars 1306, 1308 without the drill collars themselves undergoing rotation (only translation). This is necessary since the flowlines 1362, 1382 are not radially symmetric (i.e., their engagement is dependent upon proper radial alignment).

Accordingly, as the drill collars 1306, 1308 are made up by rotation of the connecting sub 1307, the components 1360, 1380 are drawn into fluid engagement, via the hydraulic stabber 1313 and central bores 1361, 1381 in the respective ends thereof, so as to define an axially-oriented fluid conduit 1322 for fluidly-connecting the auxiliary flow lines 1362, 1382 of the two components 1360, 1380.

The body assembly 1312 further comprises multiple complementing pin-to-socket electrical contacts 1390a (upper pins), 1390b (lower sockets) that cooperate to define at least one conductive pathway 1374 for electrically-connecting the electrical lines 1364, 1384 of the two components 1360, 1380. The electrical lines 1364, 1384 are attached axially to the conductive pathway 1374 of the body assembly 1312 by way of pins 1385 in a pin-to-socket design, but may also be either soldered or crimped in place, among other known means of attachment. The conductive pathway 1374 is radially oriented (i.e., it includes a segment that is radially oriented) across the upper and lower pairs of complementing pin-to-socket electrical contacts 1390a (upper pins), 1390b (lower sockets).

While an assembly for adjusting the length of the body assembly 1312 is not shown in FIG. 13, for the sake of simplicity, it should be appreciated by those skilled in the art that such an additional assembly will at least be desirable in a number of applications. Particular examples of such assemblies are discussed above in reference to FIGS. 7-8.

Figure 14A:
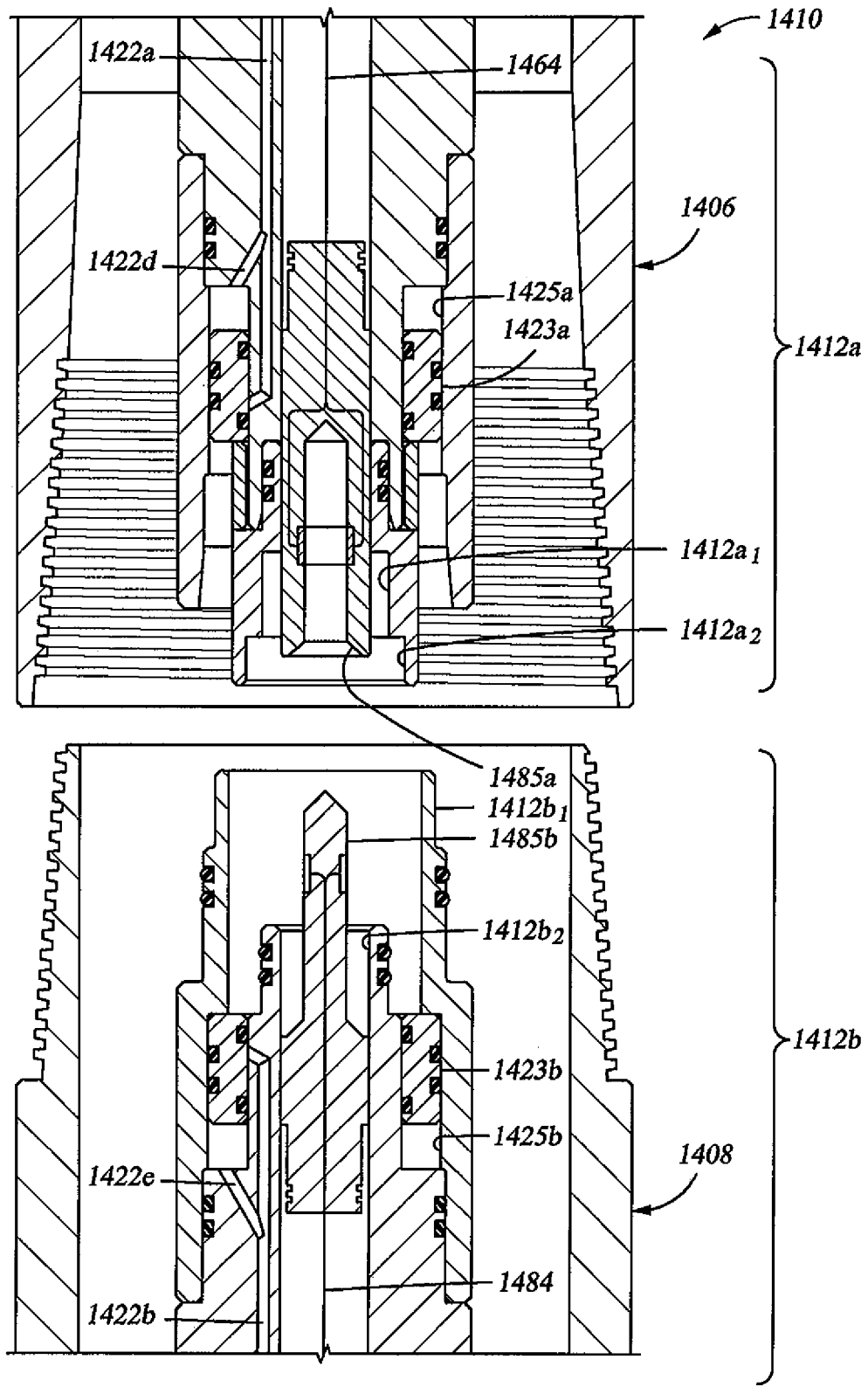
FIGS. 14A-B are schematic, cross-sectional view of a connector having valves for automatically closing off the flow lines of inter-connected components upon disconnection of first and second tubular members of the connector's body assembly.
Figure 14B:
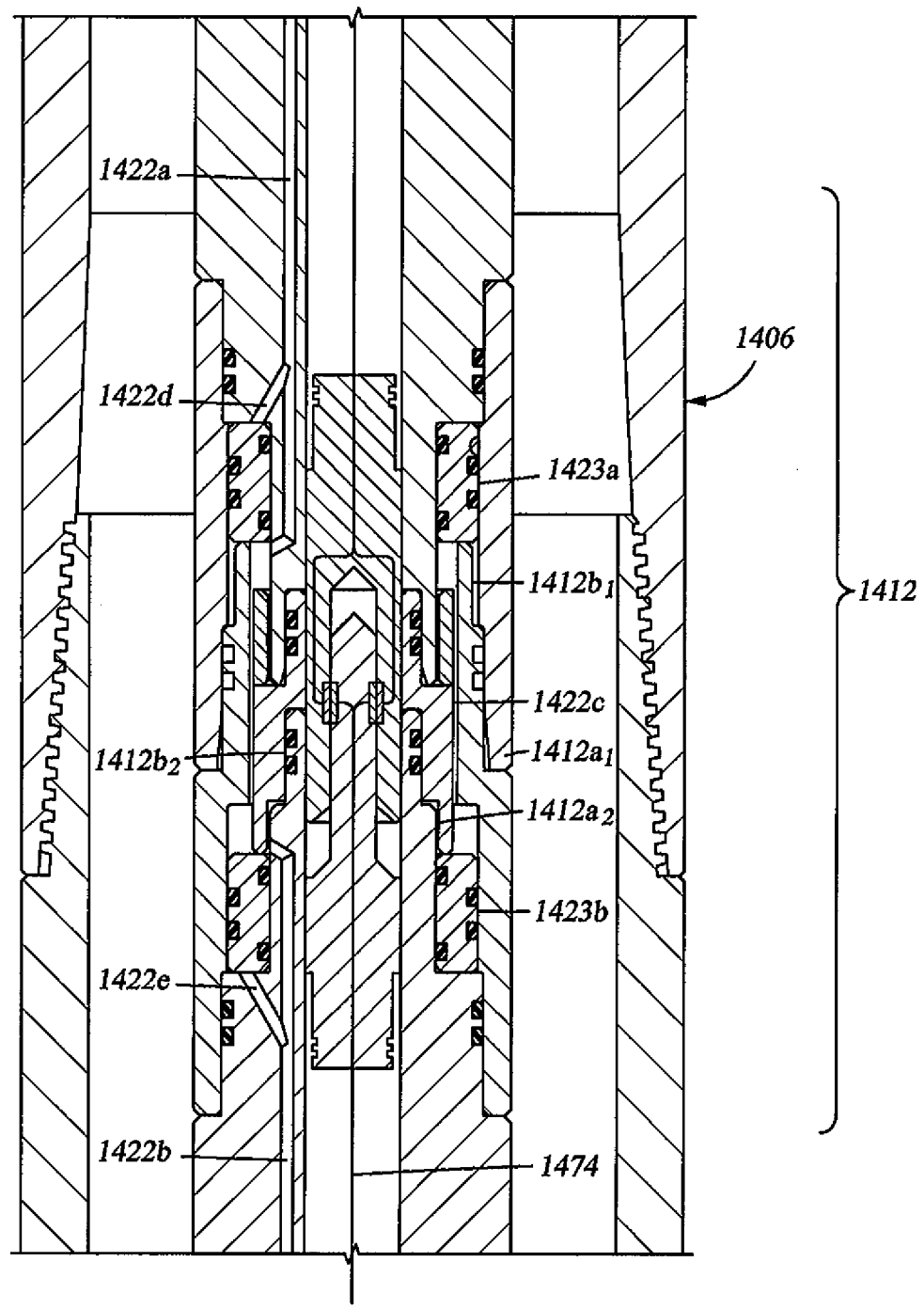

FIGS. 14A-B are sequential, sectional representations of a particular embodiment of a connector 1410 having means for automatically closing off the flow lines of the connected components upon disconnection of first and second tubular members of the body assembly 1412. The connector embodiment 1410 has utility in the axially-oriented, auxiliary flow lines (not shown) of two components (not shown) carried within respective drill collars 1406, 1408. The body assembly of the connector 1410 comprises connectable first and second tubular members, 1412a/b. The first tubular member 1412a is carried for movement with the upper component (not shown) which is fixed to and moves with an upper drill collar 1406, and includes concentric tubular portions that define an outer box portion $1412a_1$ and an inner box portion $1412a_2$ of the body assembly.

The second tubular member 1412b is carried for movement with the lower component (not shown) which moves with the lower drill collar 1408, and includes concentric tubular portions that define an outer pin portion 1412b1 and an inner pin portion 1412b2 of the body assembly 1412. Accordingly, as the upper and lower drill collars 1406, 1408 are made up (made-up engagement shown in FIG. 14B) by relative rotation therebetween, the box and pin portions of the body assembly 1412 are also rotated and are driven into connective engagement so as to define an axially-oriented, annular fluid conduit for fluidly-connecting the auxiliary flow lines (not shown) of the two components (not shown).

The annular fluid conduit includes a first conduit portion 1422a formed in the first tubular member 1412a, a second conduit portion 1422b formed in the second tubular member 1412b, and an intermediate third conduit portion 1422c formed upon the engagement of the first and second tubular members 1412a/b of the body assembly 1412. Each of the first and second tubular members 1412a/b comprise a valve defined in this embodiment by a respective annular piston 1423a/b movable through a chamber defined by an annulus 1425a/b (see FIG. 14A) therein for automatically opening the third conduit portion 1422c of the auxiliary flow line upon connection of the first and second tubular members 1412a/b and automatically closing the third conduit portion 1422c upon disconnection of the first and second tubular members 1412a/b.

Thus, piston 1423a, which is moved by its engagement with the outer pin portion 1412b1 from a closing position to an opening position (see sequence from FIG. 14A to FIG. 14B), will automatically move back to the closing position by the application of fluid pressure (or, alternative force-applying means, such as a coil spring) in the first conduit portion 1422a and fourth conduit portion 1422d when the first and second tubular members 1412a/b are disengaged. Similarly, piston 1423b, which is moved by its engagement with the inner box portion 1412a2 from a closing position to an opening position (see sequence from FIG. 14A to FIG. 14B), will automatically move back to the closing position by the application of fluid pressure (or, alternative force-applying means, such as a coil spring) in the second conduit portion 1422b and fifth conduit portion 1422e when the first and second tubular members 1412a/b are disengaged. O-ring sets (not numbered) are typically carried about the respective pin portions of the body assembly 1412 for sealing the fluid connection across the first and second tubular members 1412a/b. It will be appreciated that O-rings or other sealing means may be similarly used elsewhere for fluid flow integrity, as is known in the art.

The first and second tubular members 1412a, 1412b also cooperate to define at least one conductive pathway 1474 for electrically-connecting the electrical lines 1464, 1484 (see FIG. 14A) of the two components (not numbered). The electrical lines 1464, 1484 are attached axially to the conductive pathway of the body assembly 1412 by way of respective upper (box) and lower (pin) wet stab members 1485*a/b*, but may also be either soldered or crimped in place, among other known means of attachment.

While an assembly for adjusting the length of the body assembly 1412 is not shown in FIG. 14, for the sake of simplicity, it should be appreciated by those skilled in the art that such an additional assembly will at least be desirable in a number of applications. Particular examples of such assemblies are discussed above in reference to FIGS. 7-8.

Figure 15:
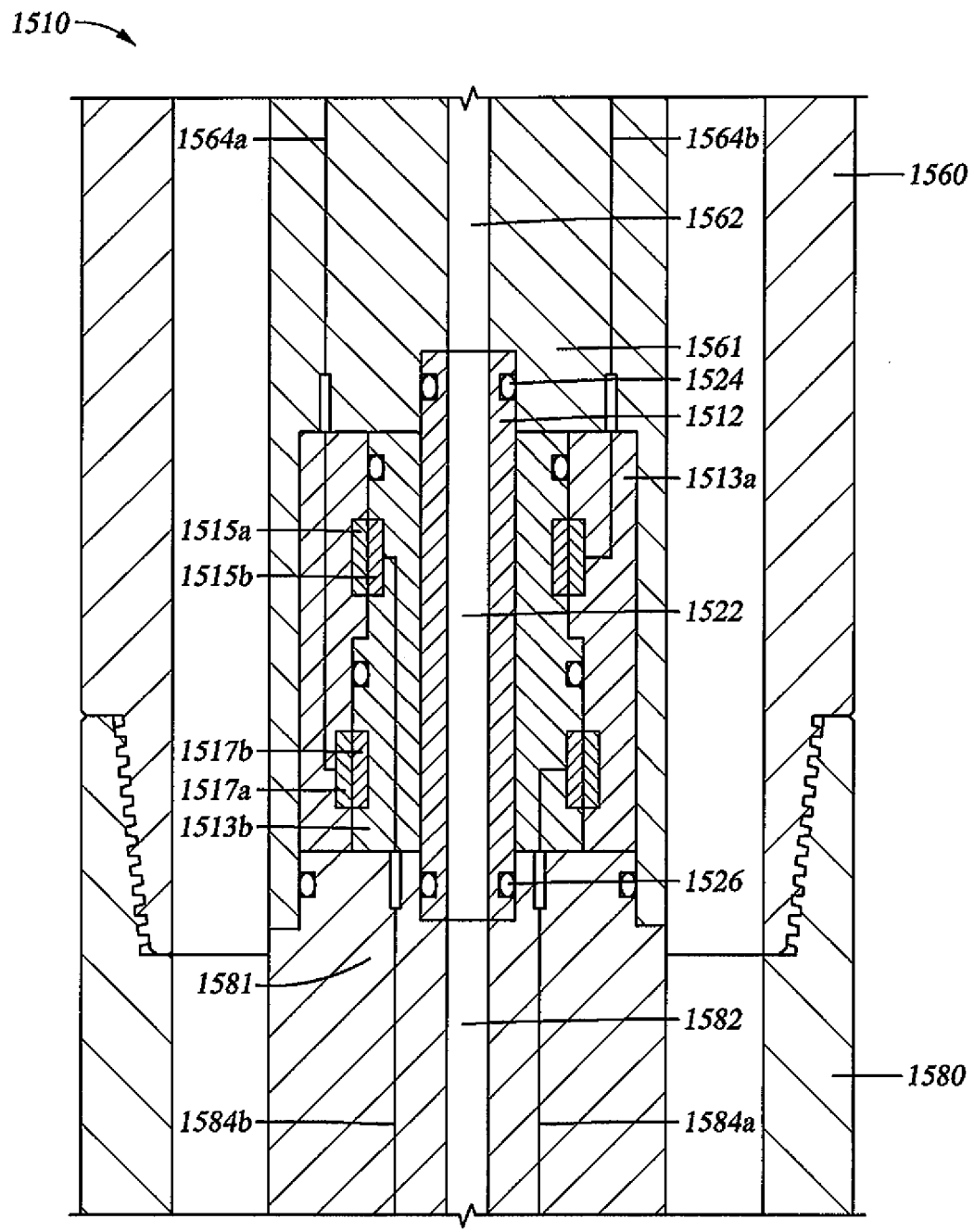
FIG. 15 is a schematic, cross-sectional view of two components of a downhole tool string connected by a connector having a plurality of electrical connections with concentrically disposed rings and a fluid connection.

FIG. 15 is a sectional representation of an alternate connector 1510 for use in connecting electrical lines 1564*a/b*, 1584*a/b* that extend through and terminate at or near opposing ends 1561, 1581 of two respective components 1560, 1580 of a downhole tool string (represented by connected drill collars 1560, 1580). The components 1560, 1580 may be distinct downhole tools, and need not be discrete modules of a unitary tool.

The connector 1510 comprises an inner body assembly 1512 for fluidly-connecting the flow line 1562, and a first and second outer body assembly 1513*a* and 1513*b* for electrically-connecting the electrical lines 1564*a/b*, 1584*a/b* of the respective two components 1560, 1580. The various portions of the inner and outer body assemblies 1512 and 1513 and of the two components 1560, 1580 may be integrally arranged in various configurations. For example, the inner body assembly 1512 may be integral with the outer body assembly 1513*a* and the component 1560. However, as shown in FIG. 15, the inner body assembly 1512, the outer body assemblies 1513*a* and 1513*b*, and the two components 1560, 1580 may each be wholly separate components.

The inner body assembly 1512 defines at least one fluid conduit 1522 for fluidly-connecting the flow lines 1562, 1582 of the two components. The inner body assembly is typically equipped with O-ring seals 1524, 1526 for sealing the fluid connection across the ends 1561, 1581 of the connected components 1560, 1580. It will be appreciated that O-rings may be similarly used elsewhere for fluid flow integrity, as is known in the art. In particular, the inner body assembly 1512 engages a recess in the component 1560 near the end 1561. An opposite end of the inner body assembly 1512 engages a recess in the component 1580 near the end 1581. The inner body assembly 1512, as shown, may move relative to the components 1560, 1580, and the outer body assembly 1513*b*, thereby permitting flexibility in the connector 1510.

The outer body assembly 1513 is equipped with at least two conductive pathways for electrically-connecting the electrical lines 1564*a/b*, 1584*a/b*. Such electrical pathways are useful for conducting electrical signals through the body assembly 1513. The electrical signals may include power transferred between and/or through the components 1560 and 1580, and/or may include data transmission that may be digital and/or analog, or may be a combination of any of the above.

In particular, the outer body assemblies 1513*a* and 1513*b* have mating surfaces to ensure good electrical contact between the lines 1584 and 1564. Specifically, assembly 1513*a* includes a portion 1515*a* and 1517*a* of contact rings 1515 and 1517, and assembly 1513*b* includes mating portions 1515*b* and 1517*b*. The mating surfaces may be stepped, to provide stability, a plurality of stops, etc. and may include a plurality of O-ring seals as shown. In operation, the two components 1560, 1580 are connected, such as with the threaded portions shown. In doing so, the inner body assembly 1512 will engage ends 1561, 1581 of the components 1560, 1580, thereby constructing a fluid conduit across 1562, 1522, and 1526. Additionally, the portions 1515*a* and 1515*b*, and the portions 1517*a* and 1517*b* will come together to create the electrical connectors 1515 and 1517, thereby providing an electrical pathway between the electrical lines 1564*a/b*, 1584*a/b*.

It will be understood from the foregoing description that various modifications and changes may be made in the preferred and alternative embodiments of the present disclosure without departing from its true spirit.

This description is intended for purposes of illustration only and should not be construed in a limiting sense. The scope of this disclosure should be determined only by the language of the claims that follow. The term "comprising" within the claims is intended to mean "including at least" such that the recited listing of elements in a claim are an open set or group. Similarly, the terms "containing," having," and "including" are all intended to mean an open set or group of elements. "A," "an" and other singular terms are intended to include the plural forms thereof unless specifically excluded.

What is claimed is:

1. A modular downhole tool, comprising:
   a first module, a second module, and a third module, each comprising:
   a drill collar;
   a drilling fluid passageway to direct a drilling fluid through the module;
   a first formation fluid passageway to direct a first formation fluid through the module; and
   a second formation fluid passageway to direct a second formation fluid through the module; and
   a connector configured to connect to an end of each one of the first, second, and third modules to couple any one of the first, second, and third modules to another of the first, second, and third modules to transfer the drilling fluid, the first formation fluid, and the second formation fluid between the connected modules, wherein the connector comprises a body assembly having a first fluid conduit configured to direct the first formation fluid through the connector, and a second fluid conduit configured to direct the second formation fluid through the connector.

2. The modular downhole tool of claim 1, wherein the connector comprises a body assembly for fluidly connecting the first formation fluid passageway of any one of the first, second, and third modules to the first formation fluid passageway of another of the first, second and third modules.

3. The modular downhole tool of claim 1, wherein the connector comprises a body assembly separate from the first module, the second module, and the third module.

4. The modular downhole tool of claim 1, wherein the first, second, and third modules each comprise a hydraulic fluid passageway to direct a hydraulic fluid through the module; and wherein the connector is configured to transfer the hydraulic fluid between the connected modules.

5. The modular downhole tool of claim 1, wherein the first, second, and third modules each comprise an electrical line to transmit power and/or data through the module; and wherein the connector is configured to transfer the power and/or data between the connected modules.

6. The modular downhole tool of claim 1, wherein the first module comprises a probe module comprising:
   a first inlet fluidly connected to an exterior of the downhole tool to receive the first formation fluid; and
   a second inlet fluidly connected to an exterior of the downhole tool to receive the second formation fluid.

7. The modular downhole tool of claim 1, wherein the first module comprises a probe module having a probe configured to isolate a portion of a wall of a wellbore extending into a subterranean formation and to withdraw the first formation fluid and the second formation fluid from the subterranean formation into the first module; and wherein the second module comprises a pump-out module to pump the first formation fluid and the second formation fluid between the first, second, and third modules.

8. The modular downhole tool of claim 1, wherein the first module comprises a probe module having a probe configured to isolate a portion of a wall of a wellbore extending into a subterranean formation and to withdraw the first formation fluid and the second formation fluid from the subterranean formation into the first module; wherein the second module comprises a downhole fluid analysis module coupled to the probe module by the connector; and wherein the third module comprises a pump-out module to pump the first formation fluid and the second formation fluid between the first, second, and third modules.

9. The modular downhole tool of claim 1, comprising a second connector configured to connect to the end of each one of the first, second, and third modules to couple any one of the first, second, and third modules to another of the first, second, and third modules to transfer the drilling fluid, the first formation fluid, and the second formation fluid between the connected modules.

10. The modular downhole tool of claim 1, wherein the first module comprises a first probe module having a first probe configured to isolate a portion of a wall of a wellbore extending into a subterranean formation; wherein the third module comprises a second probe module having a second probe configured to isolate a portion of a wall of a wellbore extending into a subterranean formation; and wherein the second module comprises a hydraulic module coupled to the first probe module and the second probe module to provide hydraulic power to the first probe module and the second probe module via a hydraulic fluid.

11. The modular downhole tool of claim 1, wherein the first module comprises a first downhole fluid analysis module to analyze the first formation fluid; and wherein the second module comprises a pump-out module to pump the first formation fluid and the second formation fluid between the first, second, and third modules.

12. A modular downhole tool, comprising:
a first module, a second module, and a third module, each comprising:
a drill collar;
a drilling fluid passageway to direct a drilling fluid through the module;
a first fluid passageway to direct a first fluid through the module; and
a second fluid passageway to direct a second fluid through the module, wherein the first and second fluids each comprise formation fluid and wherein the first and second fluid passageways are isolated from the drilling fluid passageway; and
a connector configured to connect to an end of each one of the first, second, and third modules to couple any one of the first, second, and third modules to another of the first, second, and third modules to transfer the drilling fluid, the first fluid, and the second fluid between the connected modules.

13. The modular downhole tool of claim 12, wherein the first fluid comprises formation fluid and wherein the second fluid comprises hydraulic fluid.

14. The modular downhole tool of claim 12, wherein the first and second fluids each comprise formation fluid, and wherein the first module, the second module and the third module each comprise: a hydraulic fluid passageway to direct a hydraulic fluid through the module, wherein the connector is configured to transfer the hydraulic fluid between the connected modules.

15. The modular downhole tool of claim 12, wherein the connector comprises a body assembly having a first fluid conduit configured to direct the first fluid through the connector, a second fluid conduit configured to direct the second fluid through the connector, and a third fluid conduit configured to direct a hydraulic fluid through the connector.

16. The modular downhole tool of claim 12, wherein the first module, the second module and the third module each comprise:
a first engagement mechanism at a first end of the drill collar; and
a second engagement mechanism at a second end of the drill collar;
wherein the first engagement mechanism of any one of the first, second, and third modules is configured to couple to the second engagement mechanism of another of the first, second, and third modules.

17. The modular downhole tool of claim 12, wherein the drilling fluid passageway, the first fluid passageway, and the second fluid passageway each extend along a length of the module from a first end of the module to a second end of the module.

18. The modular downhole tool of claim 12, the first, second, and third modules each comprise an electrical line to transmit power and/or data through the module, and wherein the connector comprises an electrical pathway to transfer the power and/or data between the connected modules.

* * * * *